(12) United States Patent
Crupi

(10) Patent No.: US 10,889,940 B2
(45) Date of Patent: Jan. 12, 2021

(54) ROTATIONAL MIXING AND INDUCTION HEATING SYSTEM AND METHOD FOR RECYCLING ASPHALT USING THE SAME

(71) Applicant: Francesco Crupi, St. Petersburg, FL (US)

(72) Inventor: Francesco Crupi, St. Petersburg, FL (US)

( * ) Notice: Subject to any disclaimer, the term of this patent is extended or adjusted under 35 U.S.C. 154(b) by 161 days.

(21) Appl. No.: 16/268,587

(22) Filed: Feb. 6, 2019

(65) Prior Publication Data
US 2020/0248410 A1 Aug. 6, 2020

(51) Int. Cl.
| | | |
|---|---|---|
| *C10C 1/19* | (2006.01) | |
| *C10C 3/00* | (2006.01) | |
| *E01C 7/26* | (2006.01) | |
| *B01F 9/06* | (2006.01) | |
| *B01F 15/06* | (2006.01) | |
| *E01C 19/10* | (2006.01) | |
| *H05B 6/10* | (2006.01) | |

(Continued)

(52) U.S. Cl.
CPC ............... *E01C 7/26* (2013.01); *B01F 9/06* (2013.01); *B01F 15/065* (2013.01); *B01F 15/067* (2013.01); *E01C 19/1004* (2013.01); *E01C 19/1036* (2013.01); *H05B 6/10* (2013.01); *B01F 2009/0092* (2013.01); *B01F 2015/062* (2013.01); *B01F 2215/0063* (2013.01); *B01F 2215/0422* (2013.01); *B01F 2215/0472* (2013.01); *C10C 1/005* (2013.01); *C10C 1/19* (2013.01); *C10C 3/005* (2013.01); *E01C 19/10* (2013.01)

(58) Field of Classification Search
CPC .............. C08L 95/00; H05B 6/06; H05B 6/10

USPC ......... 366/78, 81, 348; 106/273.1, 277, 280, 106/284
See application file for complete search history.

(56) References Cited

U.S. PATENT DOCUMENTS

| | | | |
|---|---|---|---|
| 5,517,004 A | 5/1996 | Blonk | |
| 2011/0247525 A1* | 10/2011 | Nasser | ................ E01C 19/1063 106/668 |

(Continued)

OTHER PUBLICATIONS

European Search Report for Appl. 20155981.2-1002, dated Jul. 20, 2020.

*Primary Examiner* — Nina Bhat
(74) *Attorney, Agent, or Firm* — Robert Varkonyi; Zagrebelsky Law P.A.

(57) ABSTRACT

An asphalt processing system is formed from a heating drum and an induction heating system. Flights move asphalt through the heating drum, which concurrently heat the asphalt along with the heating drum wall. A mixing drum can be connected to the heating drum, and include paddles or flights to move the asphalt, while concurrently mixing the material to ensure consistent temperatures through the asphalt cement. The asphalt is heating using one or more induction heating systems to quickly heat the asphalt to between 275° F. and 750° F., followed by moving the asphalt to between 275° F. and 350° F. The system can include a convection system that heats recirculated air through the heating drum. A water condenser can be employed to remove moisture during air recirculation, and reduce asphalt moisture content. The asphalt cement is optionally modified by addition of one or more rejuvenation oils. This system is particularly useful for recycled asphalt pavement, but can be used for all asphalt products.

27 Claims, 21 Drawing Sheets

(51) Int. Cl.
*B01F 9/00* (2006.01)
*C10C 1/00* (2006.01)

(56) References Cited

U.S. PATENT DOCUMENTS

2017/0081809 A1* 3/2017 Guymon ................ B65G 33/14
2017/0113703 A1* 4/2017 Hoffman ................ H05B 6/362
2017/0254164 A1   9/2017 Folk et al.
2017/0305800 A1* 10/2017 Crupi .................... F27D 13/002
2017/0306570 A1* 10/2017 Crupi .................... E01C 19/104

* cited by examiner

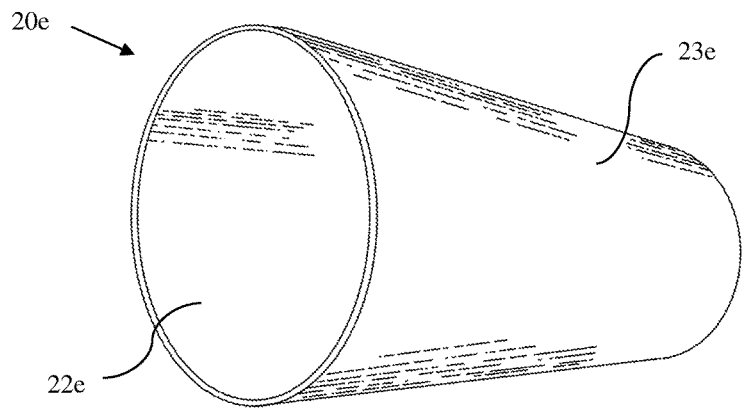
FIG. 12A
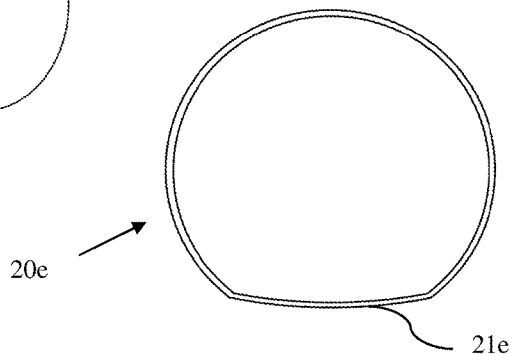
FIG. 12E
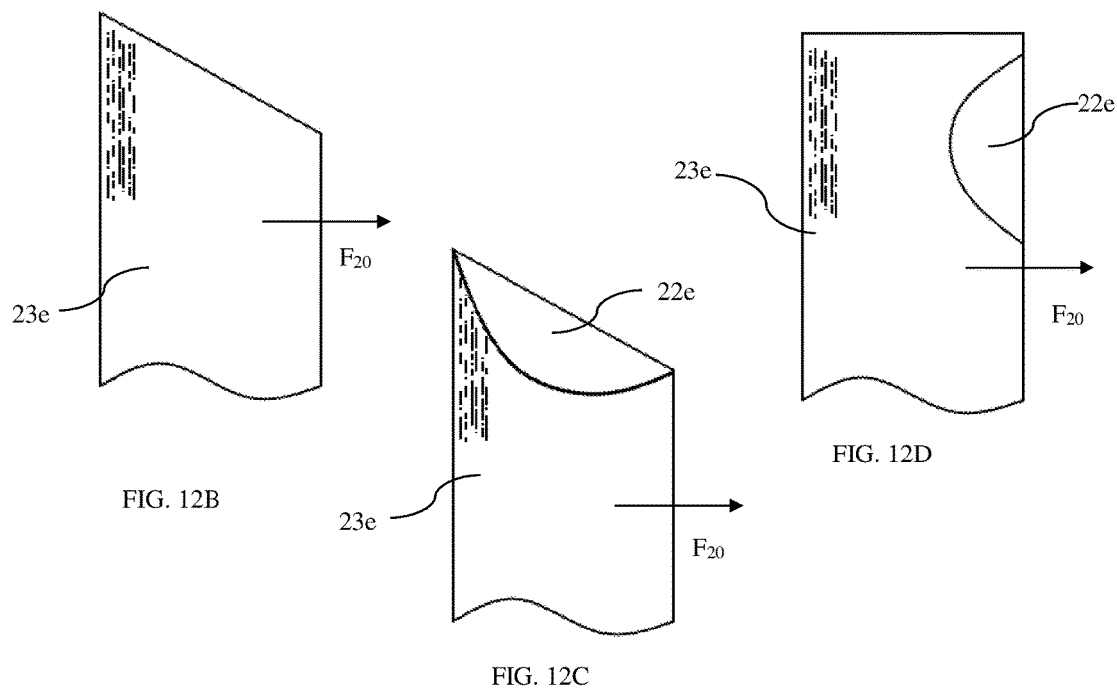
FIG. 12B
FIG. 12C
FIG. 12D

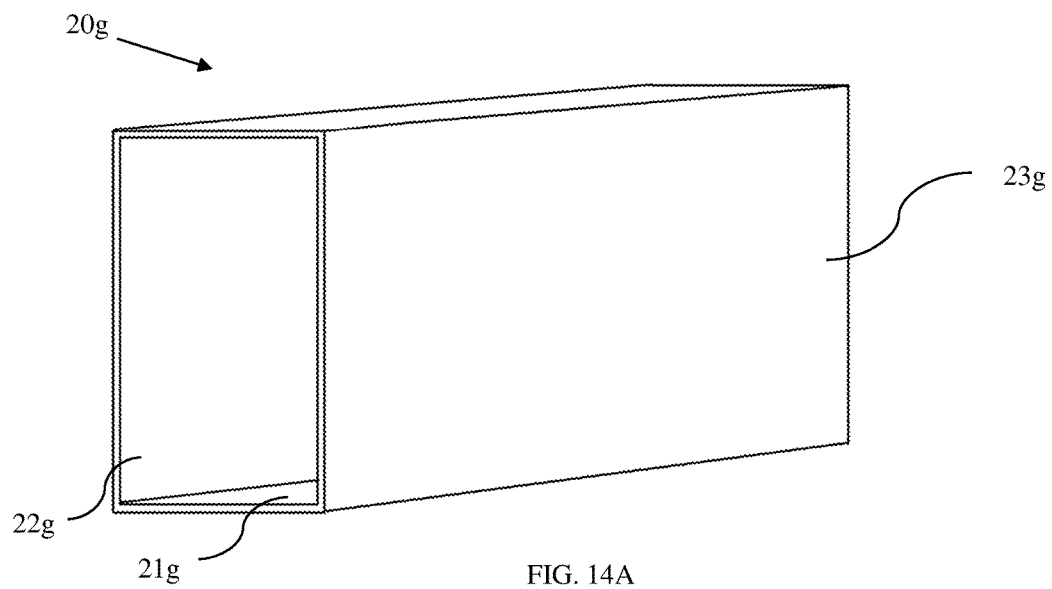
FIG. 14A
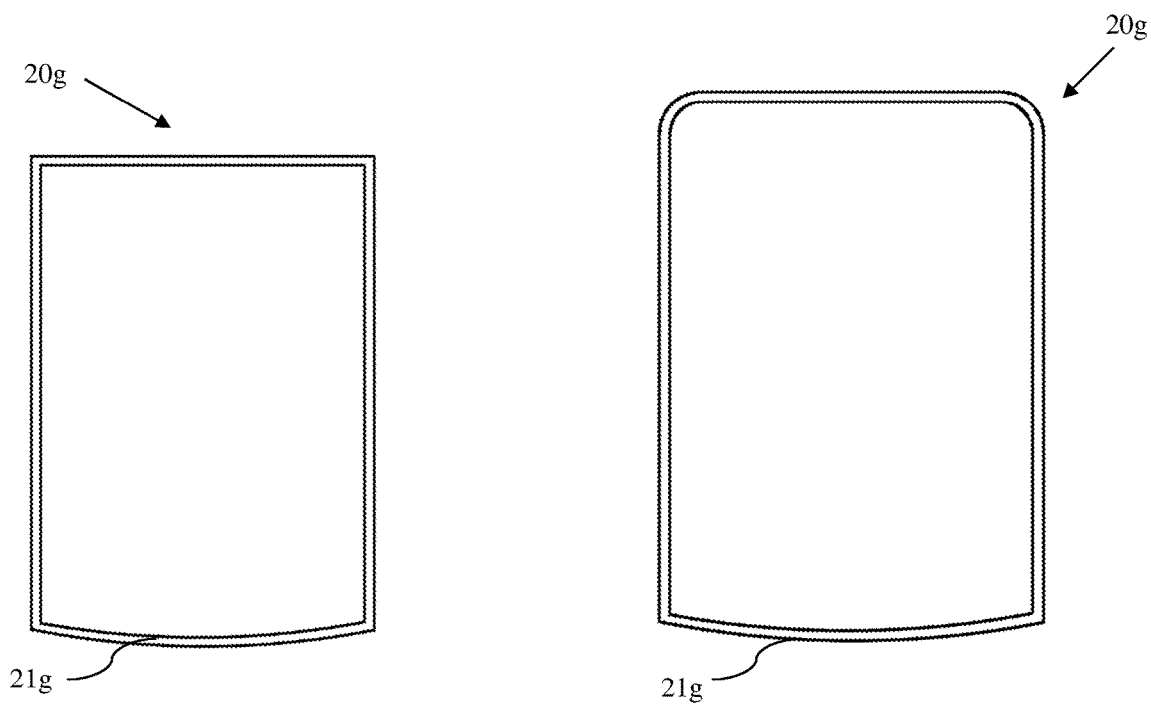
FIG. 14B
FIG. 14C

ROTATIONAL MIXING AND INDUCTION HEATING SYSTEM AND METHOD FOR RECYCLING ASPHALT USING THE SAME

FIELD OF INVENTION

The invention relates generally to a system and method for recycling used asphalt material. Specifically, the invention discloses a system and method to heat Reclaimed Asphalt Pavement (RAP), asphalt mix and virgin asphalt aggregates controllably using induction heating, while simultaneously mixing the asphalt material along the heating drum using the interior of the drum or inducted heating flights; whereby the uniform heating of the used asphalt material inhibits moisture from surging from the used asphalt material, greatly improves environmental impact with less energy consumption, concurrently reduces emissions from the heating asphalt, as no maltenes are burnt off in the processing, and also helps to maintain the structural integrity of the asphalt or rejuvenated asphalt.

BACKGROUND OF INVENTION

The asphalt used for paving, refining, and industrial uses is a solid or semi-solid bituminous material that is either naturally occurring, or derived from petroleum refining processes and includes paraffinic and aromatic hydrocarbons and heterocyclic compounds. In paving, mineral aggregates such as crushed stone are typically mixed with asphalt materials, producing pavement-type products suitable for vehicular or related traffic, such as those seen in Table 1. In addition to asphalt use in road and highway applications, asphalt is a commonly used material for construction purposes, such as roofing materials, water and damp-proofing products, bridge decks, racetracks, airport runways, parking lots, bicycle paths, and port facilities.

TABLE 1

Typical Constituents of Asphalt Concrete Used in Pavement Applications.

| Type of Constituent | Examples |
| --- | --- |
| Aggregate Material | mineral aggregates, crushed concrete, fly ash, sand, gravel, crushed stone, slags, screenings, recycled asphalt pavement, recycled asphalt shingles |
| Binders | bitumen/asphalt cement (AC) |
| Additives | cellulose fibers, synthetic mats and grids |

The performance required of any asphalt material is determined by its end use and/or application and is gauged by one or more measurable properties.

The most common type of paving composition in the United States is hot mix asphalt (HMA), which involves melting a pre-selected mixture of mineral aggregate and asphalt in a large heated tank. There are numerous mix designs used to meet climatic conditions and vehicular traffic. The mineral aggregate particle size gradation and asphalt type providing the optimum set of performance properties is referred to as the Job Mix Formula, of which there are numerous variations to satisfy the requirements of the pavement to include: vehicular traffic, climate conditions, and useful life expectancy.

Some major problems associated with the performance of hot mix asphalts (HMA) pavements can be moisture susceptibility (striping), permanent deformation (rutting), bleeding, shoving, and cracking (thermal and fatigue). The asphalt binder is selected for the paving environment to provide sufficient stiffness to resist rutting at expected high service temperatures and enough flexibility to resist fatigue and thermal cracking at intermediate and low service temperatures. Asphalts are exposed to weathering, which provokes aging due to a decrease in the maltenes phase, produced by oxidation. This asphalt aging is dependent upon the temperature and partial pressure to which the asphalt is exposed (Glover, et al., Evaluation of binder aging and its influence in aging of hot mix asphalt concrete: literature review and experimental design. (Texas Transportation Institute, 2009; chapter 2). The oxidation forms carbonyl (COO) functional groups which cause the asphalt to stiffen, becoming less elastic and viscous. As the asphalt stiffens, fatigue resistance decreases significantly, resulting in cracking and loss of structural integrity (Glover, et al., Evaluation of binder aging and its influence in aging of hot mix asphalt concrete: literature review and experimental design. (Texas Transportation Institute, 2009; chapter 2).

Once the asphalt loses structural integrity, it must be resurfaced. Resurfacing is typically performed using in situ processing of the asphalt, such as hot in-place asphalt processing, or repaving. However, those skilled in the art use a blend of virgin asphalt with existing asphalt, called Reclaimed Asphalt Pavement (RAP). For example, hot in-place asphalt processing heats the damaged pavement to 107° C. at a depth of 20 to 40 mm (to 112 in) using propane burners, followed by scarifying the pavement and blending virgin aggregate and compacting the pavement (Kandhal & Mallick, Pavement Recycling Guidelines for State and Local Governments Participant's Reference Book. (U.S. Dept. of Transportation 1997; chapter 11).

Alternatively, the road can be milled and repaved. It is known that the milling of old road surfaces provides a number of advantages in preparing the old roadbed for resurfacing. Milling uses rotating drums possessing cutters disposed around the outer circumference, typically rotating opposite to the direction of drive wheels, to remove the upper layer of asphalt. It not only ensures a new, smooth and level base for the new hot mix overlay, but at the same time lowers the road bed height to maintain bridge deck clearances and curb and gutter depths. Grinding or milling is also beneficial in removing potholes, old cracks, joint seams, and ruts along with other surface damage that would quickly reappear in a new surface overlay if not repaired. The milled asphalt is collected and placed in a holding bin, and subsequently transported to a storage location or disposal landfill.

Generally, asphalt-paved highways, driveways, avenues, and streets are recyclable. This is because asphalts are mainly composed of asphaltenes and maltenes, which can be oxidized as discussed above. The majority of existing roadways, both concrete and bituminous asphalt, undergo constant repair and surface overlay with new hot mix asphalt to achieve and maintain safe and comfortable high-speed riding surfaces. In most instances the new asphalt does not contain purely virgin asphalt, but includes a percentage of recycled asphalt, taken from road milling and processed for reuse. RAP includes removed and/or reprocessed pavement materials containing asphalt and aggregates. These materials are generated when asphalt pavements are removed for reconstruction, resurfacing, or to obtain access to buried utilities. After removing the damaged asphalt from roads, asphalt recycling plants are used for recycling. Typically, asphalt recycling plants average 400 tons per hour to 600 tons per hour production ranges and 15% to 30% RAP can be injected into these plants.

To recycle asphalt, those of skill in the art add the RAP directly to virgin asphalt. The virgin asphalt is superheated, as seen in Table 2, followed by mixing the RAP and virgin asphalt together in a drum, such as that seen in FIG. 1. The virgin asphalt transfers heat to the RAP during mixing, to provide adequate rheological properties for mixing and laying the roadway. However, during this process aggregates are heated above 650° F., which is the flash point for asphalt cement, and added to the asphalt cement, thereby transferring heat from the aggregate. The superheating causes material formation on the dryer, hot elevator and screen tower, requiring extensive clean up or replacement of those parts. More importantly, the heat transfer from the superheated material results in release of maltenes from the asphalt, as seen by the excessive smoke formation, and causes premature aging of the virgin asphalt, i.e. rapid oxidation due to the high temperatures.

TABLE 2

Temperature Requirements for Virgin Asphalt in for RAP-Virgin asphalt mixing to meet desired RAP and moisture content (taken from Kandhal & Mallick, Pavement Recycling Guidelines for State and Local Governments Participant's Reference Book. (U.S. Dept of Transportation 1997; chapter 5).

| Recycled asphalt composition | Water content (%) | Virgin asphalt temperature to achieve recycled mix discharge temperature of: | | | |
|---|---|---|---|---|---|
| | | 104° C. (220° F.) | 115° C. (240° F.) | 167° C. (260° F.) | 138° C. (280° F.) |
| 10% RAP/ 90% virgin | 0 | 121° C. (250° F.) | 138° C. (280° F.) | 152° C. (305° F.) | 163° C. (325° F.) |
| | 1 | 127° C. (260° F.) | 143° C. (290° F.) | 154° C. (310° F.) | 168° C. (335° F.) |
| | 3 | 138° C. (280° F.) | 149° C. (300° F.) | 163° C. (325° F.) | 174° C. (345° F.) |
| | 5 | 193° C. (290° F.) | 157° C. (315° F.) | 168° C. (335° F.) | 182° C. (360° F.) |
| 30% RAP/ 70% virgin | 0 | 157° C. (315° F.) | 179° C. (345° F.) | 191° C. (375° F.) | 207° C. (405° F.) |
| | 1 | 168° C. (335° F.) | 185° C. (365° F.) | 202° C. (395° F.) | 218° C. (425° F.) |
| | 3 | 196° C. (385° F.) | 213° C. (415° F.) | 229° C. (445° F.) | 246° C. (475° F.) |
| | 5 | 224° C. (435° F.) | 241° C. (465° F.) | 257° C. (495° F.) | 274° C. (525° F.) |
| 50% RAP/ 50% virgin | 0 | 210° C. (410° F.) | 235° C. (455° F.) | 257° C. (495° F.) | 282° C. (540° F.) |
| | 1 | 240° C. (465° F.) | 268° C. (515° F.) | 288° C. (550° F.) | 310° C. (590° F.) |
| | 3 | 302° C. (575° F.) | 327° C. (620° F.) | 349° C. (660° F.) | 374° C. (705° F.) |
| | 5 | 365° C. (690° F.) | 390° C. (735° F.) | 413° C. (775° F.) | 438° C. (820° F.) |

While the temperatures in Table 2 have been deemed appropriate to achieve the desired mix temperature at the exit, temperatures are higher due to the recycling system design. For example, when cold wet RAP is injected into hot mix plants, the super-heated virgin aggregates (600° to 9000 Fahrenheit) conductively transfer enough heat to the cold wet RAP for drying and heating all materials to a mixing temperature of 300° F. However, it is common that the sudden and violent steam expansion that is created when the super-hot aggregate (600° to 9000 Fahrenheit) encounters the cold wet RAP instantly overloads exhaust system airflow capacity and results in fracturing of the asphalt. Such fracturing results in the asphalt mix gradations drifting out of specifications. Further, this superheating process leads to excessively high temperatures to dry and heat RAP and can therefore inflict heat damage, generate blue smoke that prematurely ages asphalt, and failure to the virgin asphalt. This is particularly important, as premature aging of the RAP blended mix can remove as much as 50% of the performance life of the road mix. Another problem is that Plant productive capacity drops off dramatically when running RAP due to exhaust system and dryer burner overloads from RAP steam blockages within dryers.

Moreover, rapid heating of the asphalt material too abruptly causes surges of steam and blue smoke, that damage the recycling system, and also degrade the structural integrity of the asphalt cement. This also impacts virgin asphalt that is mixed with damaged RAP, where asphalt producers commonly burn off blue smoke formed at mixing stage as fuel to hide the damage to the blended mix. However, as noted before, the high temperatures damage the asphalt and substantially reduce road life.

While current methods provide for low-concentrated use of reclaimed asphalt, resulting asphalt mixes typically possess comprised performance with respect to wear. As such, there is an unmet need to provide novel processing systems to rejuvenate reclaimed asphalt that possess aging and temperature tolerance properties that mimic virgin asphalt.

SUMMARY OF THE INVENTION

An asphalt processing system is provided. The asphalt processing system is formed from a heating system, optional additive mixing system, and induction heat source. The asphalt heating system is formed of a drum, having a tubular or conal wall, encompassing an interior and having a first end and a second end. An opening is disposed on the first end of the drum to accept asphalt cement constituents, like Reclaimed asphalt pavement (RAP), asphalt cement, aggregates, and a combination thereof, and an output at a second end of the drum to expel hot asphalt mix. In some variations, one or more bins is provided upstream of the input, meaning asphalt binder, RAP, or asphalt cement constituents like aggregates are able to fall or be transported easily to the input. The drum optionally possesses heating transfer flights disposed in the interior wall of the drum. However, other variations do not use flights, and it is contemplated that some variations of the drum lack flights and have a smooth or substantially smooth interior wall. The exterior of the heating chamber is optionally covered—partially or fully—in insulation. In some variations, the insulation is alumina-silica insulation, cellulose insulation, or combinations thereof. The insulation can be applied to a thickness of about 0.75 inch to about 2.5 inches, and thickness ranges contained therein. Nonlimiting examples are 0.75 inch, 0.85 inch, 0.9 inch, 1 inch, 1.15 inch, 1.25 inch, 1.35 inch, 1.5 inch, 1.75 inch, 2 inches, 2.25 inches, and 2.5 inches. However, one of skill in the art can readily vary the thickness of the insulation to vary heat loss from the heating drum. The heating drum wall is heated by a heating source, such as induction heating, radiant heat, convection heat, or electric heating coils. The heating drum is optionally formed of an induction-responsive material, namely ferrimagnetic, ferromagnetic, or other material that interacts with an induction heating system to generate heat. Examples of useful induction-responsive materials include iron, steel, CHT 400 steel, $Fe_2O_3$, $NiOFe_2O_3$, $CuOFe_2O_3$, $MgOFe_2O_3$, MnBi, Ni, MnSb, $MnOFe_2O_3$, steel, cobalt, NiFe, molypermalloy (molybdenum, nickel, iron alloy; 2-81-17%), sendust (aluminum, silicon, iron alloy; 6-9-85%), nickel-iron alloy (50-50%), and mixtures thereof. The thickness of the heating drum wall optionally has a thickness of between about 0.25 inch and about 2 inches, and ranges of thickness contained therein. Nonlimiting examples are 0.25 inch, 0.3 inch, 0.4 inch, 0.45 inch, 0.5 inch, 0.55 inch, 0.6 inch, 0.65 inch, –0.7 inch, 0.75 inch, 0.85 inch, 0.9 inch, 1 inch, 1.15 inch, 1.25 inch, 1.35 inch, 1.5 inch, 1.75 inch, and 2 inches. However, one of skill in the art can readily vary the thickness of the heating drum wall based on the material selected for the drum wall, the application, heating characteristics, and desired durability.

Asphalt heating system is optionally oriented at angle $\theta_A$, to allow asphaltic material to roll to bottom of the heating drum at a preferred rate of about 5 to about 36 inches per rotation. Nonlimiting examples include 5 inches per rotation, 5.5 inches per rotation, 6 inches per rotation, 6.5 inches per rotation, 7 inches per rotation, 7.5 inches per rotation, 8 inches per rotation, 8.5 inches per rotation, 9 inches per rotation, 9.5 inches per rotation, 10 inches per rotation, 11 inches per rotation, 12 inches per rotation, 13 inches per rotation, 14 inches per rotation, 15 inches per rotation, 16, inches per rotation, 17 inches per rotation, 18 inches per rotation, 19 inches per rotation, 20 inches per rotation, 21 inches per rotation, 22 inches per rotation, 23 inches per rotation, 23.5 inches per rotation, 24 inches per rotation, 24.5 inches per rotation, 25 inches per rotation, 26 inches per rotation, 27 inches per rotation, 28 inches per rotation, 29 inches per rotation, 30 inches per rotation, 31 inches per rotation, 32 inches per rotation, 33 inches per rotation, 34 inches per rotation, 35 inches per rotation, or 36 inches per rotation. The system is typically designed to run at a speed of 1 rpm to 60 rpm. Nonlimiting examples include 1 rpm, 5 rpm, 10 rpm, 15 rpm, 20 rpm, 25 rpm, 30 rpm, 35 rpm, 40 rpm, 45 rpm, 50 rpm, 55 rpm, and 60 rpm. A decline of 0° to about 25° is envisioned, however the angle can differ based on the viscosity of the asphaltic material, speed of the heating drum rotation, gravity, humidity and other environmental factors surrounding and within the heating drum. Nonlimiting examples include 0°, 2.5°, 4°, 5°, 6°, 7°, 7.5°, 8°, 10°, 12.5°, 15°, 17.5°, 20°, 22.5°, and 25°.

In some variations, one or more heating transfer flights are disposed on the interior of the heating drum wall. The heat transfer flights are optionally formed of an induction-responsive material, namely ferrimagnetic, ferromagnetic, or other material that interacts with an induction heating system to generate heat, such as those materials listed above. The heat transfer flights can be connected to the interior of the heating drum at a mounting edge or mounting face by bolting, welding, including without limiting the invention, arc welding, oxy-fuel welding, shielded metal arc welding, gas metal arc welding, metal inert gas welding, tungsten inert gas welding, electric resistance welding, electroslag welding, flux cored arc welding, laser beam welding, electron beam welding, magnetic pulse welding, adhesive, brazing, and soldering. The one or more heating transfer flights are paddles, rounded paddles, finger-shaped flights, angled flights, C-shaped flights, chi-shaped flights, ovoid flights, rectangular tube flights, rounded, rectangular flights, triangular tube flights, rounded triangular flights, circular tube flights, or a combination thereof. Other flights, such as those traditionally used in heating drums, are contemplated for use in the interior of the drum, though in many instances such flights will lack advantageous properties of some specific heating transfer flights. An example of a traditional flight is seen in FIG. 1. Other heat transfer flight designs that are contemplated are seen in Taylor, et al., (U.S. Pat. No. 4,704,045); Etnyre, e al., (U.S. Pat. No. 4,427,376); Shearer (U.S. Pat. No. 4,025,057); McCarter, et al., (U.S. Pat. No. 4,298,287); Schlarmann (U.S. Pat. No. 4,165,184); Binz (U.S. Pat. No. 4,332,478); Brock, et al. (U.S. Pat. No. 4,867,572); Farnham, et al., (U.S. Pat. No. 5,054,931); Coxhill (U.S. Pat. No. 4,338,732); Milstead (U.S. Pat. No. 5,480,226); Hawkins (U.S. Pat. No. 5,364,182); and Musil (U.S. Pat. No. 4,813,784); Lutz (U.S. Pat. No. 4,307,520) Jakob, et al., (U.S. Pat. No. 5,078,540); Brock (U.S. Pat. No. 5,261,738); Keylon, et al., (U.S. Pat. No. 5,320,426); Brock, et al, (EPO Pat. Appl. EP2835470A2); Hudman, et al., (U.S. Pat. No. 8,172,448).

Paddles are formed of a cuboidic mixing bar, such as an elongated rectangular bar. The cuboidic mixing bar has a mixing face, trailing face, first edge face, second edge face and mounting face, where the mixing face and trailing face are rectangular, and the cuboidic mixing bar is square or rectangular when viewed in cross-section. The longitudinal portion of the bar extends the length of the heating drum or a portion thereof. In some variations, each bar runs ⅙ to ⅓ the length of the drum and overlaps other paddles or flights in the drum. In other variations, the paddles or flights are about 6 inches to about 24 inches in length. The finger-shaped flights are formed of cuboidic mixing blade having a mixing face, trailing face, mounting face edge and connecting edge. A set of mixing fingers are mounted on the connecting edge of the cuboidic mixing blade at an angle to the cuboidic mixing blade. Useful examples for connecting the fingers to the mixing blade include welding, adhesives, soldering or other methods disclosed above for connecting the flights to the interior of the heating drum. The angled flight are formed of a cuboidic mixing blade, having a mixing face, trailing face, mounting face edge and connecting edge. An angled blade is mounted to the connecting edge of the cuboidic mixing blade at an angle to the cuboidic mixing blade. Ovoid flights are formed of one or more tubular-ovoid mixing bodies having a mixing face, leading face, and trailing face. An opening is disposed on a first end of the mixing body to accept asphaltic material and an opening disposed on a second end for discarding heated asphaltic material from the mixing body. Useful examples for connecting the angled blade to the mixing blade include welding, adhesives, soldering or other methods disclosed above for connecting the flights to the interior of the heating drum. The chi-shaped flights are formed of a leading blade and trailing blade. The leading blade is formed of a leading tubular arc, where the tubular arc comprises a 160° to 300° arc when viewed in cross-section. Nonlimiting examples include 160°, 165°, 170°, 175°, 180°, 185°, 190°, 195°, 200°, 205°, 210°, 215°, 220°, 225°, 230°, 235°, 240°, 245°, 250°, 255°, 260°, 265°, 270°, 275°, 280°, 285°, 290°, 295°, and 300°. The leading blade has a leading edge a mixing face, a trailing face, and a mounting edge disposed adjacent to the leading edge. The trailing blade formed of a trailing tubular arc, where the tubular arc comprises a 160° to 300° arc when viewed in cross-section. Nonlimiting examples include 160°, 165°, 170°, 175°, 180°, 185°, 190°, 195°, 200°, 205°, 210°, 215°, 220°, 225°, 230°, 235°, 240°, 245°, 250°, 255°, 260°, 265°, 270°, 275°, 280°, 285°, 290°, 295°, and 300°. The trailing blade has leading edge disposed on a first edge of the trailing blade, a leading face, and a trailing mixer face. In some variations, the leading blade from a first chi-shaped flight is connected to the trailing blade of a second chi-shaped flight. In these variations, the trailing face of the leading blade from a first chi-shaped flight is connected to the leading face of the trailing blade of the second chi-shaped flight. Useful examples for connecting the leading blade to the trailing blade include welding, adhesives, soldering or other methods disclosed above for connecting the flights to the interior of the heating drum. An optional asphalt slide is disposed on the upper edge of trailing face of the leading blade from a first chi-shaped flight and leading face of the trailing blade of the second chi-shaped flight. The asphalt slide can be a portion of a steel pipe, plate steel, or other metal plate or pipe. The asphalt slide can be Useful examples for connecting the slide include welding, adhesives, soldering or other methods disclosed above for connecting the flights to the interior of the heating drum. Advantageously, the tubular and chi-shaped heating transfer flights keep the asphalt continuously churning in the heating drum. In some embodiments, the heating transfer flights overlap when viewing the heating drum in cross-section, such that a portion of a first flight overlaps a portion of the next flight. In some variations the last ⅓ of the heating drum, i.e. the third closest to the second end of the heating drum, does not possess any flights. In this embodiment, 50% of the hot asphalt mix has contact with the drum at any time. The heating transfer flights in some variations of the system possess a 5 percent angle to 15 percent angle (18° to 54°) relative to the direction of movement, $\theta_B$. Nonlimiting examples of $\theta_B$ include 5 percent angle, 7.5 percent angle, 10 percent angle, 11 percent angle, 12 percent angle, 15 percent angle, 20 percent angle, 25 percent angle, 30 percent angle, 35 percent angle, 40 percent angle, 45 percent angle, and 50 percent angle. Some variations use different angles of heating transfer flights. As nonlimiting example, the heating transfer flights are disposed at a 45 degree angle in a first region of the heating drum, followed by a shallower angle, such as 10 degrees to 20 degrees, allowing the asphalt to remain in the second region longer than the first.

The additive mixing system is formed of a mixing drum, having a tubular or conal wall, encompassing an interior and having a first end and a second end. An opening is disposed on the first end of the drum to accept hot asphalt mix, an output at a second end of the drum to expel working mix, and a plurality of additive mixing member disposed on the interior of the mixing drum wall. In some variations, at least one or more additive bins or reservoirs are in communication with the mixing drum. The additive bin or reservoir is designed to add a predetermined amount of additive to the hot asphalt mix as it enters the mixing drum. The additive mixing drum is optionally disposed adjacent to the heating drum, i.e. in a serial manner. Alternatively, the additive mixing drum is disposed over the heating drum, i.e. concentric. The exterior of the heating chamber is optionally covered—partially or fully—in insulation. In some variations, the insulation is alumina-silica insulation, cellulose insulation, or combinations thereof. The insulation can be applied to a thickness of about 0.75 inch to about 2.5 inches, and thickness ranges contained therein. Nonlimiting examples are seen in the insulation used for the heating drum insulation. Where the mixing drum is concentrically oriented over the heating drum, the heating drum can be used to heat aggregates, RAP, RAP and aggregates, or RAP, aggregates and asphaltic binder. The asphaltic binder is optionally not heated in the heating drum, but heated outside the system and injected into the mixing drum at the desired temperature.

The at least one mixing member is at least one mixing paddle, at least one U-shaped paddle, or at least one S-shaped paddle. The mixing paddle is formed of a flat front mixing face, a flat rear mixing face, and a mounting edge disposed between the flat front mixing face and the flat rear mixing face. The mounting edge of the paddle is used to connect the mixing paddle to the interior of the mixing drum using welding, adhesive, or other methods disclosed for the heating flights. Alternatively, the mixing member is a U-shaped flight, formed of a leading tubular arc, where the tubular arc comprises a 160° to 300° arc when viewed in cross-section, or having an ovoid cross-section with a portion of the cross-section removed. The U-shaped member includes a mounting edge disposed on one edge of the mixing face, wherein the mounting edge of the U-shaped flight is used to connect the mixing paddle to the interior of the mixing drum using welding, adhesive, or other methods disclosed for the heating flights. In another variation, the mixing member is a S-shaped flight, as described above for the heating transfer flights. The mixing members are optionally overlapping.

The additive mixing system optionally includes a mixer induction heating system, comprising a mixer induction heating coil disposed in the exterior of the mixing drum, and at least one magnetic material in the additive mixing drum. In some variations, the mixing drum tubular or conal wall is composed of a magnetic material adapted to heat upon exposure to magnetic force, and the mixer induction heating coil is in magnetic communication with the magnetic material of the mixing drum tubular or conal wall. In other variations, the mixing member is composed of a magnetic material adapted to heat upon exposure to magnetic forces, and the mixer induction heating coil is in magnetic communication with the magnetic material of the mixing member. In another variation, both the mixing drum tubular or conal wall and mixing member are composed of the magnetic material.

The induction heat source is formed of at least one induction coil disposed on the outside of the heating drum. The at least one induction coil is in magnetic communication with the heating drum wall and heating transfer flights, defining a first heating zone. The distances between the heating drum exterior and the induction coils can vary between about 1 inch and about 6 inches, or any range contained therein. Nonlimiting examples include 1 inch, 1.15 inch, 1.25 inch, 1.5 inch, 1.75 inch, and 2 inches, 2.25 inches, 2.5 inches, 2.75 inches, 3 inches, 3.25 inches, 3.5 inches, 3.75 inches, 4 inches, 4.25 inches, 4.5 inches, 4.75 inches, 5 inches, 5.25 inches, 5.5 inches, 5.75 inches, or 6 inches from drum. The induction coils are formed of an electromagnetic material. Nonlimiting examples include copper, iron, steel, nickel, cobalt $Sm_2Co_{17}$, and $SMCO_5$. In some variations, the induction heating system also includes at least a second induction coil composed of an electromagnetic material, disposed outside of the heating drum, and in magnetic communication with the heating drum wall and heating transfer flights. The second induction coil optionally is controlled separately from the at least one induction coil, i.e. first induction coil, permitting formation of a second heating zone. While it can be envisioned adding a plurality of induction coils, the invention is envisioned with up to four different heating zones in the heating drum. Additional induction heating coils-mixing induction coils—are optionally added to the additive mixing drum. The mixing induction coils composed of an electromagnetic material, disposed outside of the mixing drum, and in magnetic communication with the mixing drum wall, additive mixers, or both. Accordingly, the mixing drum wall, additive mixers, or both are made of an induction-responsive material, such as those described above. Alternatively, the heating system comprises an electric heating coil disposed around the heating drum wall, allowing the heating source to heat the heating drum wall. The heating system alternatively is a radiant heating source or convection heating source directed at the heating drum wall, allowing the heating source to heat the heating drum wall.

A drive system in communication with the heating drum and adapted to rotate the heating drum. In some variations, the drive system connects to the heating drum through a ring pinion is disposed on the first end of the heating drum. The ring pinion is optionally connected to the heating drum using welding, adhesive, brazing, or other methods disclosed for the heating flights. In these embodiments, a drive motor connects to a drive shaft that is in communication with the ring pinion. The drive motor spins the drive shaft, and subsequently transfers rotational movement to the ring pinion, causing the heating drum to rotate. In other variations, the heating drum is attached to a drive shaft, where the drive shaft rotatably extends through the first end the heating chamber. The drive motor connects to the drive shaft, providing rotational movement. Alternatively, the heating drum or drum system is supported by trunions and propelled by thrust rollers, saddle chain drive, or rack and pinion drive. For example, specific variations include a sprocket disposed circumferentially around the drum and in mechanical communication with a chain drive, which is in turn driven by a motor. Examples of drive motors include electric gear direct drive, friction drives, and electric chain drives, such as those by Weg Electric Corp. (Duluth, Ga.).

In some embodiments, the asphalt heating system is supported by a plurality of supports. In one embodiment, a plurality of shaft support members support the drive shaft. In this embodiment, the shaft support members are formed from at least one vertical shaft support member having an upper end and a lower end, and a shaft support ring disposed on the upper end of the at least one vertical shaft support member and in communication with the drive shaft. A plurality of ball bearings are disposed in the shaft support ring, permitting the shaft to readily spin regardless of the support. Alternatively, a plurality of drum support members provide support for the heating drum. The drum support members are formed from at least one vertical drum support member having an upper end and a lower end, and a drum support ring disposed on the upper end of the at least one vertical drum a support member and in communication with the exterior of the heating drum. A plurality of ball bearings are disposed in the drum support ring, allowing the drum to freely rotate.

The asphalt processing system optionally includes at least one convection system. The convection system is formed of a convection system input in fluid communication with the interior of the heating chamber, with a blower in fluid communication with the convection system input, and a convection system output in fluid communication with the blower. The blower comprises a blower input, a fan, and a blower output. At least one heating element is optionally included in the convection system. The heating element is disposed in the convection system input, adjacent to the blower output, or both, and can include 1, 2, 3, 4, 5, 6, 7, 8, 9, 10, 11, 12, 13, 14, 15, 16, 17, 18, 19, or 20 heating elements. Optional heating elements are at least one convection induction plate disposed in the convection system input, a line connecting the convection system input to the blower, the convection system output, a line connecting the blower to the convection system output, or a combination thereof. Optionally, the at least one heating element is an induction heating element formed from a ferromagnetic material. The at least one heating element is optionally disposed in the walls of the convection system input; the walls of the line connecting the convection system input to the blower, the walls of the convection system output, the walls of the line connecting the blower to the convection system output, a wire mesh disposed in the interior of the convection system input, a wire mesh disposed in the interior of the line connecting the convection system input to the blower, a wire mesh disposed in the interior of the line connecting the blower to the convection system output, a wire mesh disposed in the interior of the convection system output, at least one bar disposed in the interior of the convection system input where, at least one bar disposed in the interior of the line connecting the convection system input to the blower, at least one bar disposed in the interior of the line connecting the blower to the convection system output, at least one bar disposed in the interior of the convection system output, a plate disposed in the interior of the convection system input, a plate disposed in the interior of the line connecting the convection system input to the blower, a plate disposed in the interior of the line connecting the blower to the convection system output, a plate disposed in the interior of the convection system output, or a combination of the aforementioned locations. A plurality of output jets, are disposed on the lower first transfer tube end and the lower second transfer tube end. The number of output jets may be altered as would readily be apparent to one of skill in the art upon review of the specification. However, it is envisioned that the system includes 2, 4, 6, 8, 10, 12, 14, 16, 18, or 20 jets. The output jets are optionally disposed adjacent to the second induction plate, or the first half of the first induction plate, thereby directing air onto asphalt cement as the asphalt cement traverses the second induction plate or the first half of the first induction plate. A water condenser is optionally attached to the convection system input and further comprises a condenser input, water condenser chamber in fluid communication with the water condenser input, and a water condenser output.

Also disclosed is a method of manufacturing an asphaltic concrete using the aforementioned system. The asphalt can be RAP, virgin asphalt or a combination thereof. Asphalt, as asphaltic concrete or asphalt cement, is added to the system along with any cement constituents, such as aggregates, and the induction heating system activated by applying a magnetic field causing the walls of the heating drum and any flights and/or paddles to generate heat via induction. The heating drum, flights, or paddles induction plate is between 240° F. and 750° F. Nonlimiting examples include 240° F., 250° F., 260° F., 270° F., 280° F., 290° F., 300° F., 305° F., 310° F., 315° F., 320° F., 325° F., 330° F., 335° F., 340° F., 345° F., 350° F., 400° F., 450° F., 500° F., 550° F., 600° F., 650° F., 700° F., or 750° F. In some variations, the asphalt is heated to different temperatures by different heating zones. As a nonlimiting example, the heating drum is segregated into two or three temperature zones, wherein multiple sets of induction heating coils are disposed around the heating drum and heat each zone to different temperatures. In this example, a first heating zone is heated to 320° F., a second heating zone heated to 300° F., and an optional third heating zone is unheated, and serves to mix the asphalt.

In another example, the heating drum is segregated into three or four temperature zones, with the first zone heated to around 650° F. to quickly bring the asphalt to about 220° F., the second heating zone heated to around 450° F., the third heating zone heated to between 275° F. and 300° F., and an optional unheated fourth zone. The asphalt concrete mix is moved along the inducted walls of the heating drum and any flights or paddles, and the asphaltic concrete mix is mixed while moving through the heating drum. Concurrently, the asphalt concrete mix is heated by the heat formed on the induced metal surfaces. In certain variations, the asphaltic concrete mix is churned by the rotation of one or more flights disposed in the interior of the heating drum. This forms a heated mix, which is expelled from the asphalt processing system.

Optionally, the heated mix is modified by adding at least one modifier to the asphaltic heated mix. The heated mix can be modified in the final ⅓ to ⅛ of the heating drum, i.e. the ⅓ to ⅛ of the heating drum adjacent to the heating drum output. Alternatively, the mix is modified in a mixing drum disposed downstream from the heating drum. The at least one modifier is a rejuvenating oil, virgin asphalt cement, coarse aggregates, fine aggregates, or a combination thereof. The heated mix is then stirred or mixed with the at least one modifier to form a modified heated mix. In some variations, the asphaltic heated mix is heated during the modification step. In these variations, the mixing section of the heating drum, or the mixing drum, is composed of induction-responsive material, i.e. a magnetic material adapted to heat upon exposure to magnetic forces. Flights or paddles, made of induction-responsive material, are optionally included. At least one induction coil is disposed in magnetic communication with the induction-responsive material. A magnetic field is applied to heat the heating section of the heating drum or mixing drum.

Useful rejuvenating oils include naphthenic-based oils, anionic polymer solutions, mixtures of organic acids, resin acids, fatty acids, esterified fatty acids, aromatic oils, or combinations thereof.

Cyclogen® L (Tricor Refining, LLC, part of Ergon Asphalt & Emulsions, Inc., Jackson, Miss.), is a low viscosity naphthenic-based oil formed of heavy naphthenic distillate solvent extract and heavy naphthenic petroleum distillate. It is asphalt free, containing 0% asphaltene, but composed of the maltenes, saturates, and acidiffins to restore the aged binder. Cyclogen® LE (Tricor Refining, LLC, part of Ergon Asphalt & Emulsions, Inc., Jackson, Miss.), is an emulsion of hydrotreated heavy naphthenic petroleum distillate and heavy naphthenic distillate solvent extract in a cationic water solution. These recycling agents are refined from a naphthenic wax-free crude source which restore select maltenes that have oxidized from asphalt binder to rebalance the chemical composition of the aged asphalt.

ARA-1P and ARA-2P (Paragon Technical Services, Inc., part of Ergon Asphalt & Emulsions, Inc., Jackson, Miss.) are anionic emulsions of water, asphalt and heavy naphthenic distillate solvent extract. ARA-2P contains double the polymer amount included in ARA-1P.

The Hydrogreen® oils are a mixture of long chain and tricyclic organic acids, resin acids, fatty acids, esterified fatty acids and vegetable oils, used as a viscosity cutting agent or as a powerful penetrating oil and co-mingling agent for Recycled Asphalt Pavement. The materials are sold as a fluid Hydrogreen rejuvenator, like Hydrogreen® S (Asphalt and Wax Innovations), and oil-based semi-fluid rejuvenators, like Hydrogreen® HFP.

The aromatic oils are asphalt modifiers with high aromatic content. As non-limiting examples, Hydrolene® H40T, H50T, H90T and H120 (HollyFrontier Corp., Tulsa, Okla.), composed of heavy paraffinic distillate solvent extract, and Hydrolene® H600T (HollyFrontier Corp., Tulsa, Okla.), composed of residual oil solvent extract, are useful. For example, H50T is a heavy paraffinic distillate solvent extract, with a bulk density around 7.978 lbs/gal, a molecular weight of 347 g/mole, a viscosity of 27.44 CST at 60 C and 6.916 CST at 100° C., a CAS No. 64742-04-7 and boiling point of between 303° C. and 479° C., and n-octanol/water partition coefficient over 4. H90T is a heavy paraffinic distillate solvent extract, with a density around 8.1 lbs/gal, a 433 g/mole, a viscosity of 375 CST at 40° C. and 16.2 CST at 100° C., a CAS No. 64742-04-7 and boiling point of between 289° C. and 527° C., and n-octanol/water partition coefficient over 4. H110T is a heavy paraffinic distillate solvent extract, with a density around 8.2 lbs/gal, a molecular weight of 453 g/mole, a viscosity of 1760 CST at 40° C. and 33 CST at 100° C., a CAS No. 64742-04-7 and boiling point of between 409° C. and 602° C., and n-octanol/water partition coefficient over 4. H125T is a heavy paraffinic distillate solvent extract, with a density around 8.1 lbs/gal, a viscosity of 21.7 CST at 100° C., a CAS No. 64742-04-7 and boiling point of between 349° C. and 668° C., and n-octanol/water partition coefficient over 4. H600T is a residual oil solvent extract, a molecular weight of 588 g/mole, a viscosity of 61.5 CST at 100° C., a CAS No. 64742-10-5, a boiling point of between 409° C. and 602° C., and n-octanol/water partition coefficient over 4.

Paraffinic oils are materials having about half aromatic and half naphthenic molecules. They are used to maintain compatibility between the asphalt and the rejuvenator oil. Kendex MNE (American Refining Group, Bradford, Pa.), is composed of heavy paraffinic petroleum neutral distillate solvents.

Motor oils are composed of petroleum-based hydrocarbons, polyalphaolefins, and polyinternal olefins. Conventional motor oils having an SAE rating of 10W30 have been examined as rejuvenating oils, and found to be useful. A measured amount of the said rejuvenating agents is to be added such that the Performance Grade, Viscosity, or penetration of the asphalt cement in the mixture matches that of the mix design. Softening curves or blending charts are commonly used to calculate the required amount of rejuvenating agent, and it would be within the ordinary skill in the art to utilize such curves or charts in determining the amount of rejuvenating oils to add to the mix.

Some variations of the invention include at least one convection system to heat the air and provide convection heating in addition to induction heating. In these variations, the convention system is provided, as discussed above. Air is collected from the interior of the heating chamber in the convection system input, and passed over the convection system heating element. The heated air is then expelled into the interior of the heating chamber.

Optionally, moisture is extracted from the air. A water condenser is utilized, comprising a duct in fluid communication from the interior of the heating chamber or in fluid communication with the convection system input, a condensing chamber adapted to condense water, where the condensing chamber is in fluid communication with the duct and a dry air exit, in communication with the condensing chamber and the duct. Air is drawn into the condensing chamber and moisture in the air allowed to condense. The dry air is then returned to the convection system.

BRIEF DESCRIPTION OF THE DRAWINGS

For a fuller understanding of the invention, reference should be made to the following detailed description, taken in connection with the accompanying drawings, in which:

FIG. 12A an isometric view of an embodiment of a tubular flight.

FIG. 12B a top-down view of a first embodiment of a tubular flight end.

FIG. 12C top-down view of a second embodiment of a tubular flight end.

FIG. 12D top-down view of a third embodiment of a tubular flight end.

FIG. 12E a cross-sectional view of an embodiment of a tubular flight.

FIG. 14A an isometric view of a first embodiment of a rectangular tube flight.

FIG. 14B a cross-sectional view of a second embodiment of a rectangular tube flight.

FIG. 14C a cross-sectional view of a third embodiment of a rectangular tube flight.

DETAILED DESCRIPTION OF THE PREFERRED EMBODIMENT

Figure 1:
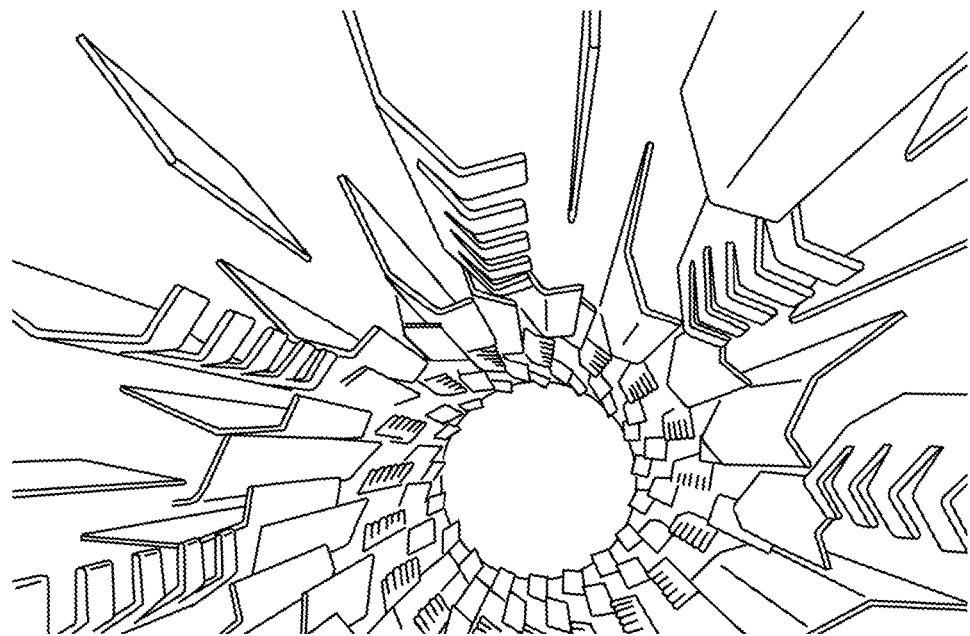
FIG. 1 is a circumferential, isometric view of a traditional drum used in the processing of asphalt in a convection heating system.

As used herein, "about" means approximately or nearly and in the context of a numerical value or range set forth means±15% of the numerical.

As used herein, "asphalt cement" refers to a tar-like substance, a type of bitumen that occurs naturally or is obtained from the distillation of coal tar, wood tar or petroleum.

As used herein, "asphaltic concrete" refers to a bituminous paving mixture that is prepared, using asphalt cement or asphalt binder with one or more aggregates. Asphaltic concrete is typically prepared in a hot-mix asphalt plant or warm-mix asphalt plant.

As used herein, "asphaltic material" refers to asphaltic concrete, reclaimed asphalt pavement, asphaltic cement, or a combination thereof.

As used herein "conal" means having a general conical structure with the apex removed, such as a frustum.

As used herein, "leading edge" means the edge of a paddle, blade, or other device which is a frontal edge based on the direction that the paddle, blade or device is moving.

As used herein, "heating source" means a system under control of a computer or user that generates heat pursuant to inputs from the computer or user. Non-limiting examples of heating sources include radiant heat source, convection heat source, induction heat source, conduction heat source. For example, without limiting the scope of the invention, an oscillating electromagnetic induction heating element or elements, radiant electric heating element or elements, infrared heating element or elements, and combustion heating.

As used herein, "substantially" means largely if not wholly that which is specified but so close that the difference is insignificant.

As used herein, "PG Rating" is defined as the average seven-day maximum and the single-day minimum pavement design temperature, in degrees Celsius, wherein the maximum is determined 20 mm below the surface of the pavement and the minimum is determined at the surface of the pavement.

As used herein, "RAP" or "reclaimed asphalt pavement" means asphalt that was collected from a prior application, such as from a road. RAP includes removed and/or reprocessed pavement materials containing asphalt cement and aggregates.

As used herein "virgin asphalt" means asphalt that has not been previously used in paving, roofing, or other applications.

As used herein, "working mix" refers to an asphaltic concrete readied for paving.

and laying the roadway. The superheating causes asphalt to burn, with the resulting burnt material collecting on the heating unit and requiring extensive clean up or replacement of those parts. More importantly, the superheated material results in release of maltenes from the asphalt, as seen by the excessive smoke formation, and causes premature aging of the virgin asphalt, and substantially reduce road life. Further, mixing of superheated material with cold material commonly results in sudden and violent steam expansion that is created when the super-hot aggregate (600° to 9000 Fahrenheit) encounters the cold, fracturing of the asphalt and causing the asphalt mix gradations drifting out of specifications.

The system and methods disclosed in this disclosure can be modified by one of skill in the art based on the information provided herein. The use of variations of sand and/or aggregates, asphalt cement, RAP, rejuvenation oils permits revising asphalt material or asphalt concrete to meet asphalt material specifications, seen in Table 3.

TABLE 3

Specification Limits For Rap Recycled Mix Acceptance Attributes.

| Properties and Attributes | Mix Type HIR Mix is Required to Meet | Lower Limit (LL) % | Upper Limit (UL) % |
| --- | --- | --- | --- |
| AC Content | All HMA type | $AC_{SPEC}$ − 0.0 (Note 1) | $AC_{SPEC}$ + 0.6 (Note 2) |
| Designated Large Sieve (DLS) | Superpave 12.5, 12.5FC 1, and 12.5FC 2 | 40 | 95 |
| Recovered AC Grade (Note 3) | Performance Grade AC (upon request) | <−28 | 58> |
| Recovered AC Penetration Test | Penetration Tests Recovered AC (dmm) | 45 dmm | 70 dmm |
| 4.75 mm Sieve | Superpave 12.5, 12.5FC 1, and 12.5FC 2 | 40 | 65 |
| 75 µm Sieve | Superpave 12.5, 12.5FC 1, and 12.5FC 2 | 2 | 13 |
| Air Voids | All HMA type | 2.0 | 5.5 |
| Pavement Compaction | Superpave 12.5 and 12.5FC 1 | 92.0 | 97.0 |
|  | Superpave 12.5FC 2 | 92.0 | 98.0 |

Notes:
1. $AC_{SPEC}$ is the AC content specified in the Contract Documents.
2. If AC is increased by more than 0.2% Bonus Payments will be paid per each 0.1% increase of AC based on the MTO asphalt index for neat asphalt PG 58-28.
3. AC RAC test will be performed on request of the owner and paid for by the owner.
4. Penn tests will be performed at the contractors expense as required by the contractor.

An asphalt recycling and processing system is provided for preparing asphalt binder through churning of the asphalt as it moves through the processor. The asphalt cement is heated via an induction system. The system advantageously increases the exposure of the asphalt to heat by 2-3 times that of conventional systems. Further, the use of induction heat allows for a more efficient heating of asphalt.

Temperatures provided herein are in Fahrenheit unless otherwise specified.

As discussed in the background section, traditional systems, i.e. convection heating, use a combustion process to heat asphalt. Virgin asphalt aggregate is superheated, most times to above 650° F., requiring 92,000 BTU/gal. The convection system has been found to be 30-40% efficient, with the remaining 60-70% lost as steam, and costs are typically between $5 to $6 per ton to process RAP into recycled asphalt. The virgin asphalt is used as a medium to then heat the remainder of the asphalt concrete mix, such as RAP, to provide adequate rheological properties for mixing The system disclosed herein heats the metal of the heating drum and, where used, the heating transfer flights, to act as a medium to heat the asphalt and asphaltic material. As such, heat generated on the metal of the drum and flights evenly and efficiently transfers to the RAP without burning or overheating the RAP and maintaining the properties of the RAP with no or little emissions are produced by the rapid heating of the RAP. This permits lower temperatures to be used, as the asphalt is heated by the metal in the heating drum. This further provides for controlled asphalt temperatures, as no material must be superheated. The asphalt, or virgin asphalt and RAP are heated in situ to the desired temperature. Further, the disclosed system permits recycling of up to 100% RAP, i.e. the system can function purely on RAP, due to the process methodology and even heating via the drum wall. Current estimates provide a power efficiency of 50% to 60%, and the estimated costs to process RAP for recycled use drops to around $0.50 per ton. The system greatly improves environmental impact, as there is less energy consumption, and concurrently less emissions, such as blue smoke, from the heating asphalt, as no maltenes are burnt off in the processing. Once the RAP is heated, a rejuvenator can be added to the RAP to bring the Asphalt Cement (AC) petroleum content of the RAP back to its virgin state to meet virgin AC standards.

Example 1

Figure 2:
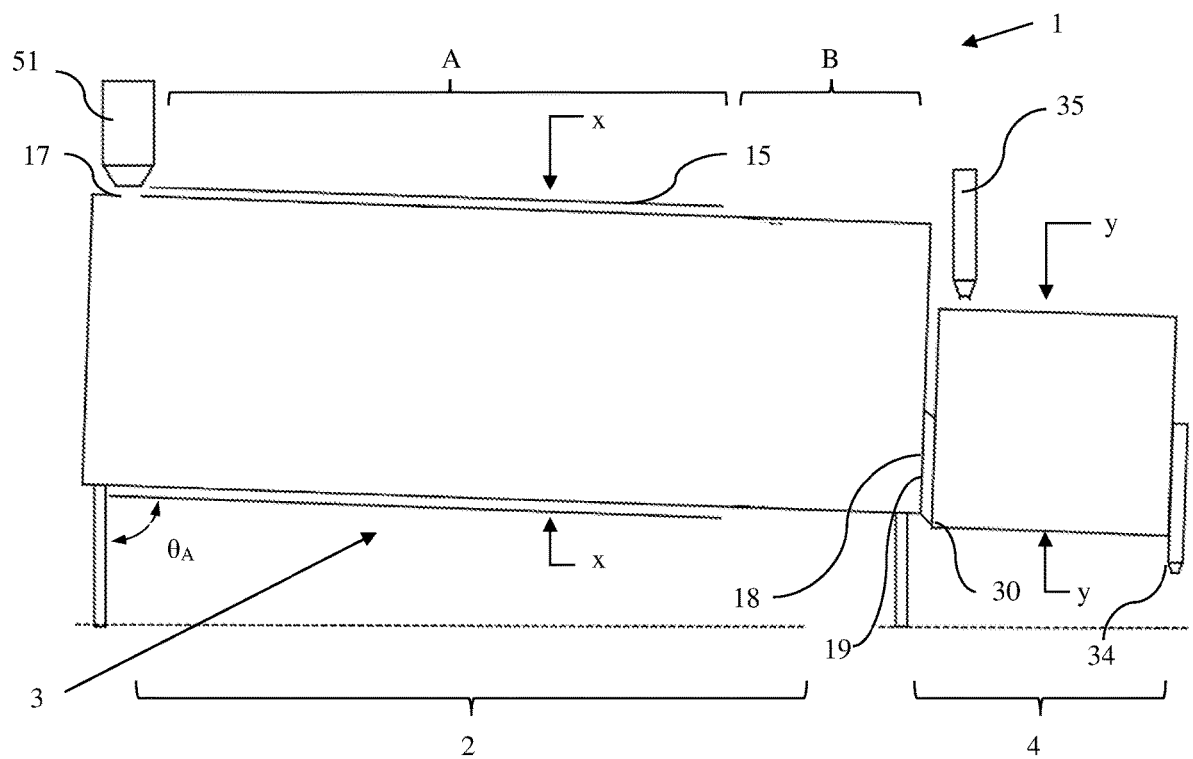
FIG. 2 is a longitudinal cross-sectional view of a first embodiment of the asphalt recycling system heating system, with additive mixing drum attached showing a first embodiment of the mixing drum.

Asphalt processor 1 is composed of asphalt heating system 2, induction heating system 3, and additive mixing system 4, as seen in FIG. 2. Asphalt processor 1 is designed to heat RAP, Virgin Aggregates, virgin asphalt, a combination of RAP and virgin asphalt, and optionally additives, i.e. asphaltic material, to the requisite temperature for paving applications.

Asphalt heating system 2 is comprised of heating drum 10, oriented at angle $\theta_A$. Angle $\theta_A$ is selected to allow asphaltic material to roll to bottom of heating drum 10 at a preferred rate of 6 to 8 inches per rotation. A decline of 7° to 10° is envisioned, however the angle can differ based on the viscosity of the asphaltic material, speed of the heating drum rotation, presence of transfer flights, gravity, humidity and other environmental factors surrounding and within the heating drum.

Figure 3:
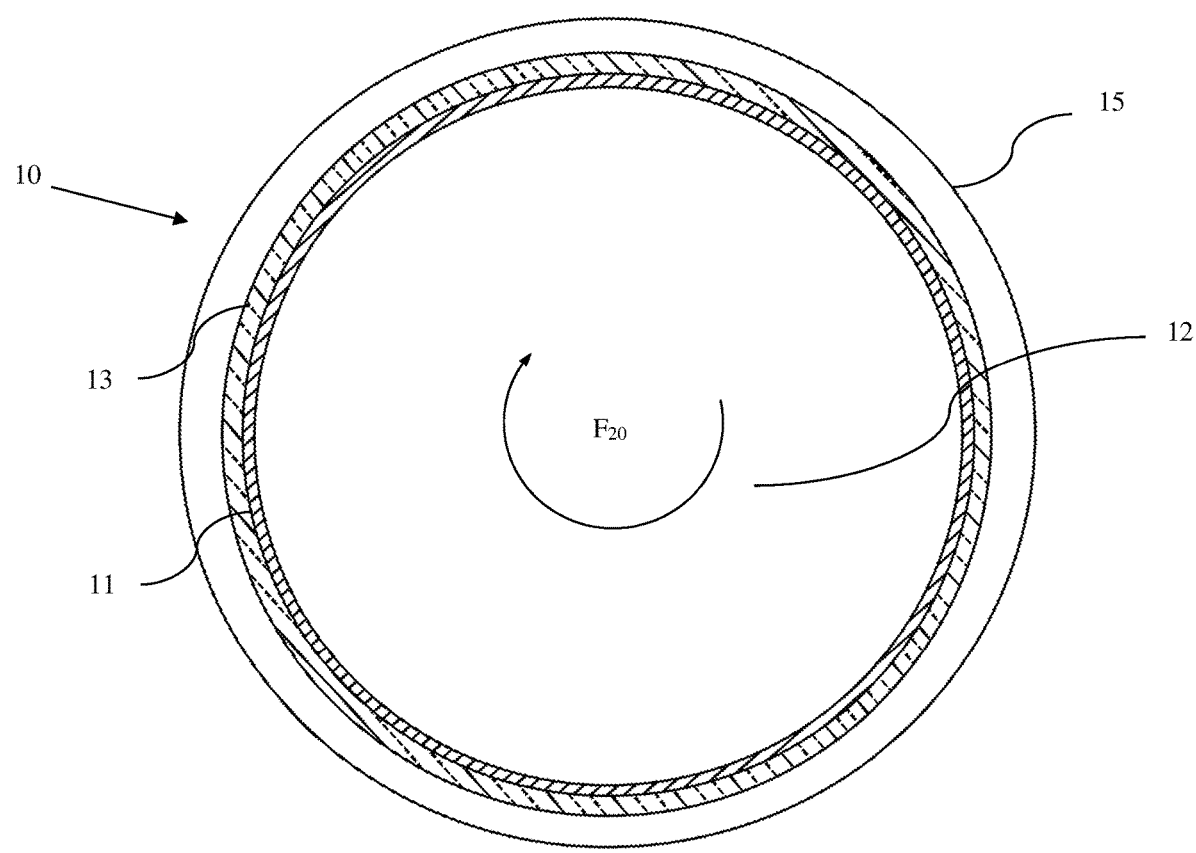
FIG. 3 is a circumferential cross-sectional view at location X-X of FIG. 2, showing a first embodiment of the asphalt heating drum.

Heating drum 10 is formed of heating drum interior 12, heating drum wall 11, and wall insulation 13, as seen in FIG. 3. The heating drum is rotationally mounted and in communication with a motor designed to rotate the drum, such as through use of a drive system. Examples of drive systems designed to rotate the drum include, without limiting the scope of the invention, chain and sprocket, wherein one or more sprocket gears are disposed on the exterior of the drum and a chain contacts with one or more sprockets attached to the drum. A gear reduction box is optionally driven with an electric motor. Heating drum wall is formed of a ferromagnetic material or composite containing ferromagnetic material, such as CHT400. Heating drum wall 11 is 1 inch in thickness, though the drum wall requires sufficient thickness to withstand heating and abrasion. Wall insulation 13 is formed of Fiberfax® alumina-silica insulation, or other high-temperature insultation, and disposed on heating drum wall 11 to limit heat transfer and escape from asphalt processor 1. Wall insulation 13 can vary in thickness, though a thickness of 1 to 2 inches is sufficient to limit a substantial amount of heat loss.

Figure 4:
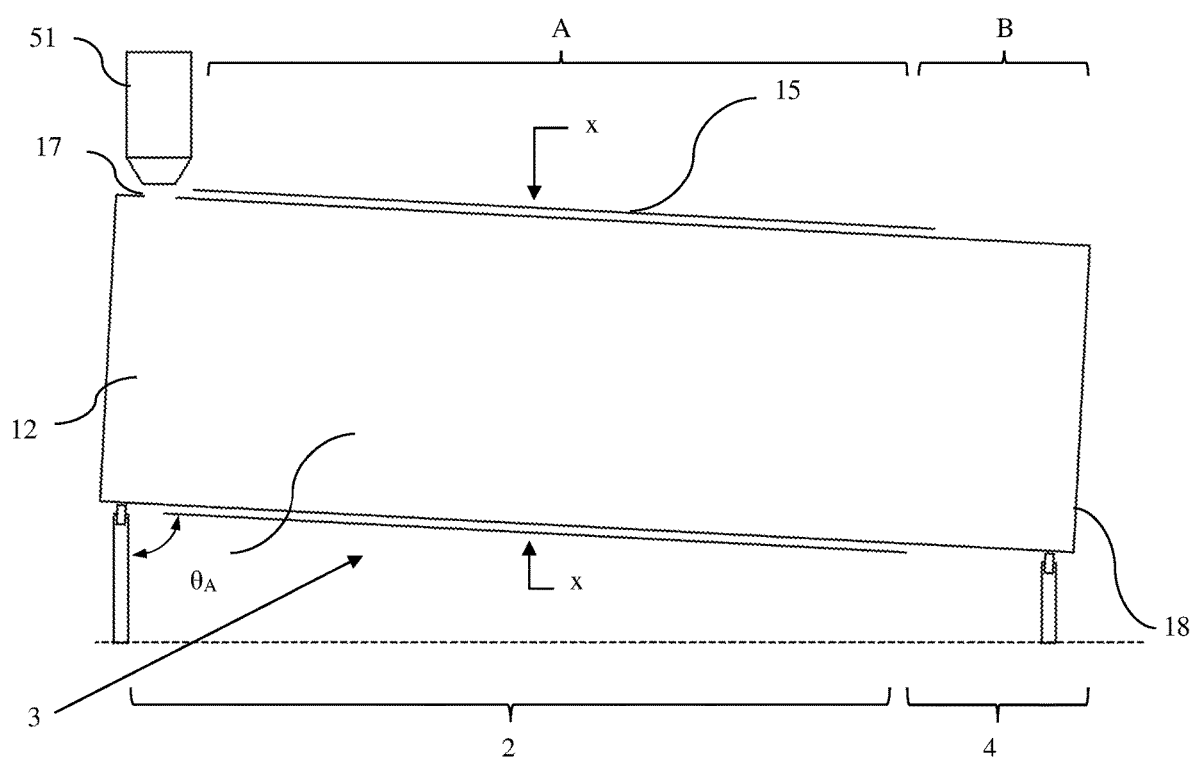
FIG. 4 is an isometric view of a second embodiment of the asphalt recycling system heating system, with the heating drum shown with supporting trunions.

Induction heating system 3 is disposed to provide differential heating in heating drum 10, thereby forming segregated heating zones, such as heating zone A and heating zone B, as seen in FIG. 4. In this example, heating zone A is heated to around 300° F. to adequately heat the asphaltic material to the requisite temperature for paving. Heating zone B is not heated, providing the drum only mixes the hot asphalt. Induction heating system 3 is formed of at least one induction coil 15 disposed outside heating drum 10, as seen in FIGS. 2 and 3. Induction coil 15 is an electromagnetic material, such as copper, having the ability to generate magnetic fields upon application of electricity to the coil. Induction coil 15 is disposed about 5 inches from wall insulation 15, and preferably encircles heating drum 10. Induction coil 15 interacts with heating drum wall 11 and any transfer flights disposed in the drum, through magnetic forces, generating induction heating to heat the asphaltic material.

Figure 5:
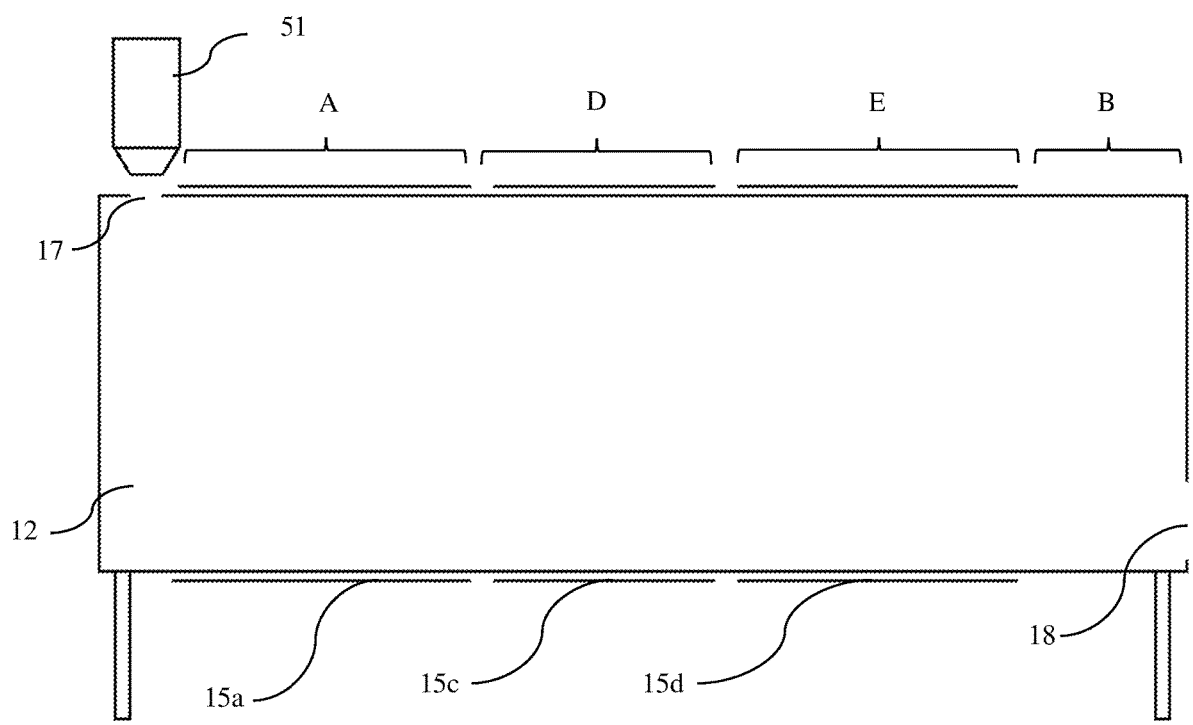
FIG. 5 is a circumferential cross-sectional of a third embodiment of the asphalt recycling system heating system, with the heating drum shown with four heating zones
Figure 15:
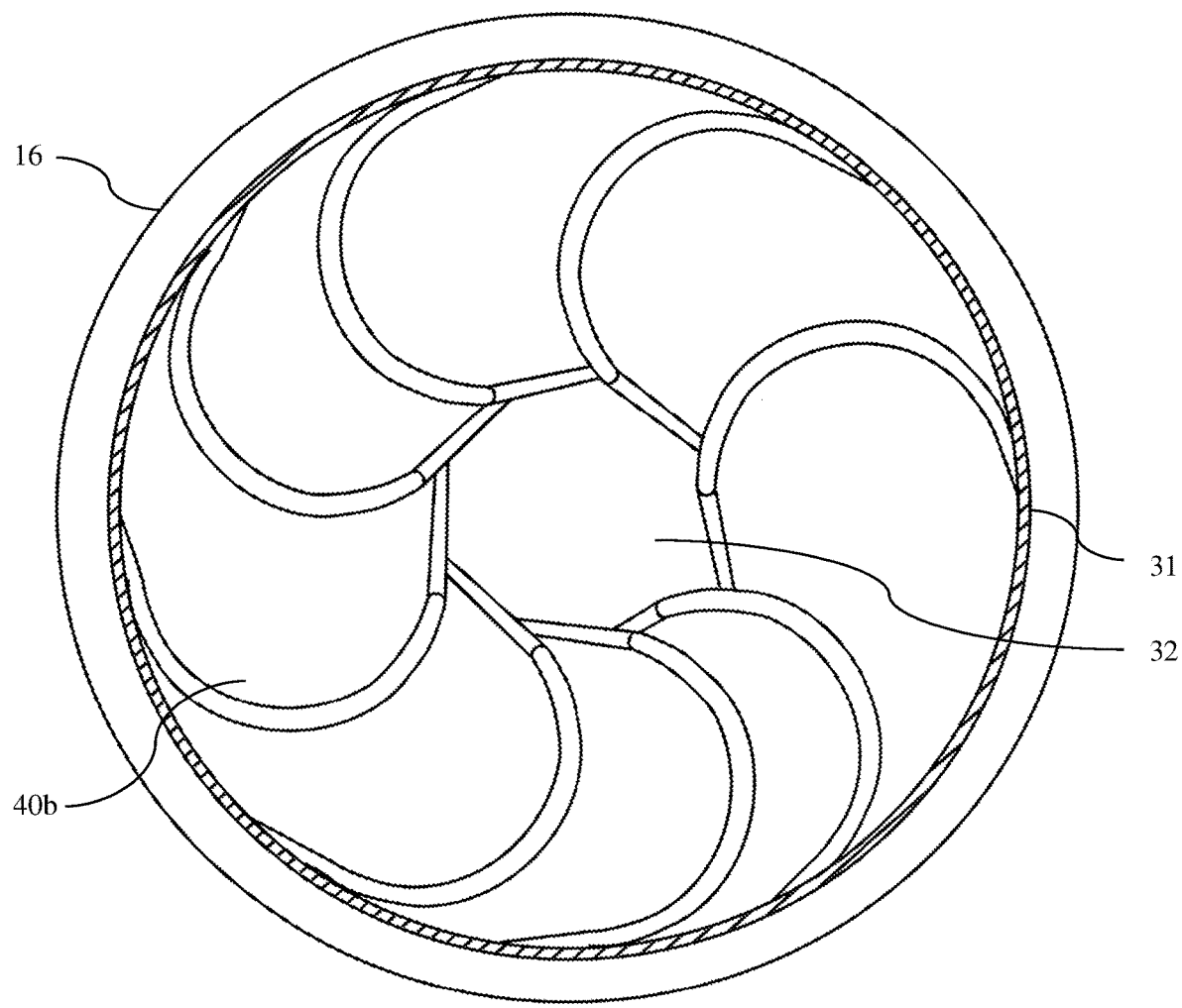
FIG. 15 is a circumferential cross-sectional view at location Y-Y of FIG. 2, showing a first embodiment of the additive mixing drum having optional mixing paddles disposed in the mixing drum.

Additive mixing system 4 is comprised of additive mixing drum 30, additive bin 35, additive mixer 40, and additive mixing output 34. Additive mixing drum 30 is around 4 feet to 5 feet in length and formed of mixing drum wall 31 and mixing drum interior 32. A plurality of rectangular paddles are disposed on the interior of mixing drum wall 11, and preferably overlap when viewed in cross-section, as seen in FIG. 5. In this example, additive mixer 40 is an additive mixing paddle 40*a*, which possesses mounting edge 41*a*, leading mixer face 46*a*, and leading trail face 47*a*, as seen in FIG. 15, and Example 9. Mounting edge 41A is adapted for mounting mixing paddle 40*a* to the interior of mixing drum wall 31. Additive mixing paddle 40*a* is made of a formed of a durable metal, such as steel. Additive mixing system 4 comprises heating zone C. In most applications, heating zone C is not elevated in temperature, and does not include an induction system. However, variations of the system can include mixing induction coil 16, permitting the system to elevate the temperature in the additive mixing drum as required, such as to 300°. In these embodiments, additive mixing drum 30 and additive mixing paddle 40*a* are made of ferromagnetic material designed to respond to electromagnetic induction, as described for the heating drum. The asphaltic material rolls along heating drum 10 until it reaches heating drum output 18. After the asphaltic material has completed its route through heating drum 10, the material exits the heating drum through heating drum output 18 and travels through heating drum transfer 19 to additive mixing system 4, seen in FIG. 2. Additives, such as rejuvenation oils, are injected into additive mixing drum 30, and the heated asphaltic material mixed with the additives by the additive mixing paddles. The asphaltic material and additive land onto the interior wall of additive mixing drum 30 and collected by additive mixing paddle 40*a*. The asphaltic material is pushed along the interior of mixing drum wall 31, until the asphaltic material and additive reach a location in the drum where the asphaltic material and additive fall off additive mixing paddle 40*a* and drop onto the interior of mixing drum wall 31. The process continues, mixing the asphaltic material and additive, until the material reaches mixing drum output 34, and the asphaltic material exits asphalt processor 1.

Example 2

Asphalt processor 1 is designed to heat RAP, Virgin Aggregates, virgin asphalt, a combination of RAP and virgin asphalt, and optionally additives, i.e. asphaltic material, to the requisite temperature for paving applications. In this variant, asphalt heating system 2 and additive mixing system 4 are both integrated into heating drum 10, as seen in FIG. 4.

Heating drum 10 is similar to example 1, having transfer flights, an angled orientation, such as angle $\theta_A$, or combination thereof to move asphaltic material to roll to bottom of heating drum 10 at a preferred rate of 6 to 8 inches per rotation. Heating drum 10 is composed of heating drum wall 11, of a induction-responsive material, and wall insulation 13, discussed in Example 1. The induction heat coils heat the drum at heating zone A, resulting in the asphalt heating to about 300° F. to 350° F. as the asphalt travels through heating zone A. The asphalt then enters heating zone B, which is unheated and serves as additive mixing system 4. Additives, such as rejuvenating fluids, virgin asphalt, and virgin aggregates, are added in additive mixing system 4, and permitted to mix to a finalized hot asphalt mix, followed by removal via drum output 18.

The heating drum is rotationally mounted and in communication with a motor designed to rotate the drum, such as by trunions. Optionally, the motor runs a drive wheel that contacts the exterior of the heating drum and rotates the drum.

Example 3

Asphalt processor 1 is designed to heat RAP, Virgin Aggregates, virgin asphalt, a combination of RAP and virgin asphalt, and optionally additives, i.e. asphaltic material, to different temperatures in asphalt heating system 2, seen in FIG. 5. In this variation, the asphalt processor can include additive mixing system 4 in the heating drum or have as additive mixing system 4, as seen in FIG. 4, an independent mixing system disposed downstream of the heating drum, as seen in FIG. 2. Accordingly, the systems discussed in Examples 1 and 2 can be incorporated in this variation of the invention.

Heating drum 10 is composed of heating drum wall 11, of an induction-responsive material, and wall insulation 13, discussed in Example 1. The induction heat coils heat the drum at heating zone A to between 350° F. and 400° F., resulting in the asphalt heating to about 325° F. to 375° F. as the asphalt travels through heating zone A. The asphalt then enters heating zone D, which is heated to between 300° F. and 350° F., and serves to form a consistent hot asphalt mix. The asphalt moves into heating zone E, which is heated to between 275° F. and 325° F. The asphalt then enters heating zone B, which is unheated and serves as additive mixing system 4. Additives, such as rejuvenating fluids, virgin asphalt, and virgin aggregates, are added in additive mixing system 4, and permitted to mix to a finalized hot asphalt mix, followed by removal via drum output 18. Alternatively, the asphalt is moved into a separate additive mixing system and additives added.

Example 4

Figure 6:
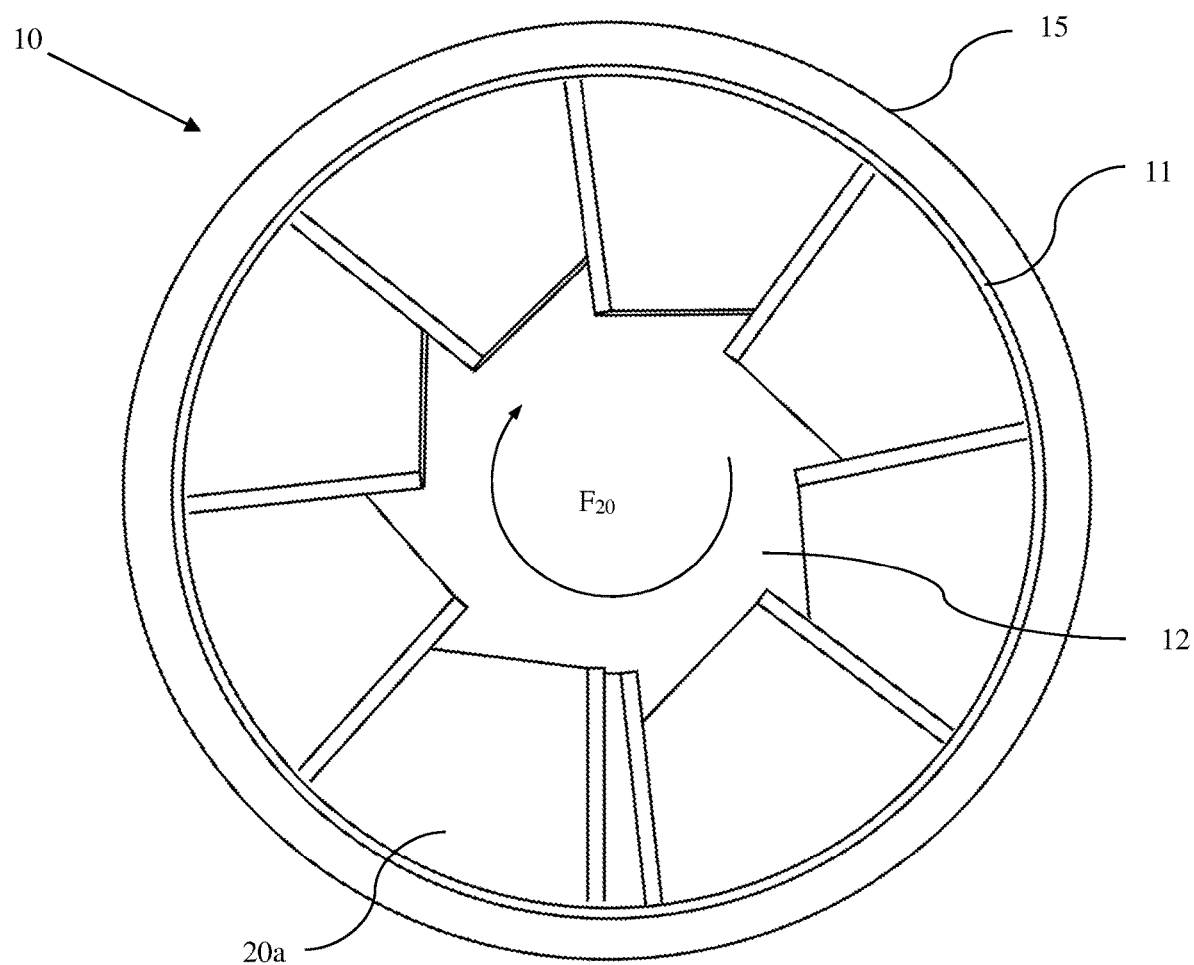
FIG. 6 is a circumferential cross-sectional view at location X-X of FIG. 2, showing a second embodiment of the heating drum having optional mixing paddles disposed in the mixing drum.

Asphalt processor 1 described in Examples 1 through 3, include at least one heating transfer flight 20, disposed on the interior of heating drum wall 11, and preferably overlapping, as seen in FIG. 6. Heating transfer flights 20, disclosed in the examples below, are disposed in the interior of heating drum 10. The heating flights can be of one type, a combination of heating flight types, or a single type of flight in a heating zone, which differs from one or more other heating zones. For example, heating zone A may have paddles, whereas heating zone B may have chi-shaped flights, and heating zone C may have C-shaped flights.

Example 5

Figure 7:
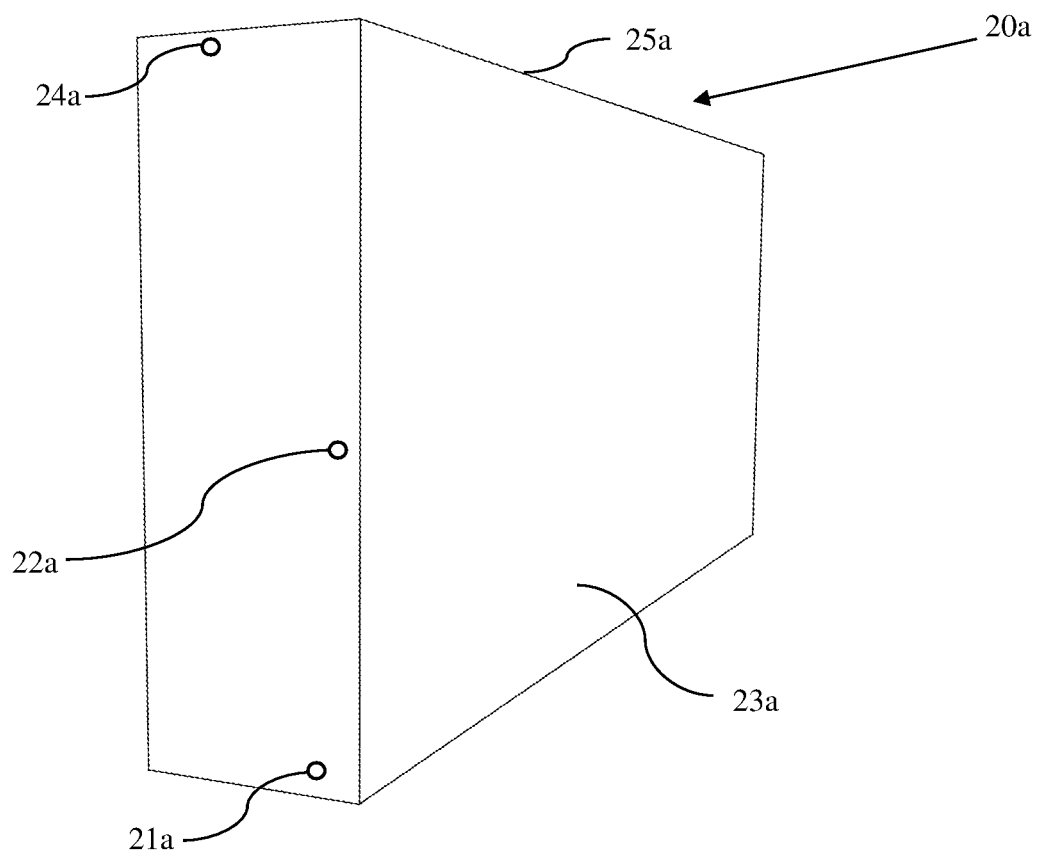
FIG. 7 is an isometric view of a first embodiment of a mixing paddle found in the heating drum.

A variation of the at least one heating transfer flight 20 is paddle 20a, seen in FIG. 7. Paddle 20a is formed of ferrimagnetic, ferromagnetic, or other material that interacts with an induction heating system to generate heat. Examples of useful induction-responsive materials include iron, steel, CHT 400 steel, $Fe_2\theta_3$, $NiOFe_2\theta_3$, $CuOFe_2\theta_3$, $MgOFe_2\theta_3$, MnBi, Ni, MnSb, $MnOFe_2\theta_3$, steel, cobalt, NiFe, molypermalloy (molybdenum, nickel, iron alloy; 2-81-17%), sendust (aluminum, silicon, iron alloy; 6-9-85%), nickel-iron alloy (50-50%), and mixtures thereof. Paddle 20a includes mounting face 21a, leading mixer face 22a, trailing mixer blade face 23a, leading mixer edge 24a, and trailing edge 25a. The flights are attached to the interior of heating drum wall by means known in the art. Nonlimiting examples include bolting, welding, adhesive, brazing, and soldering, as discussed herein.

Figure 8:
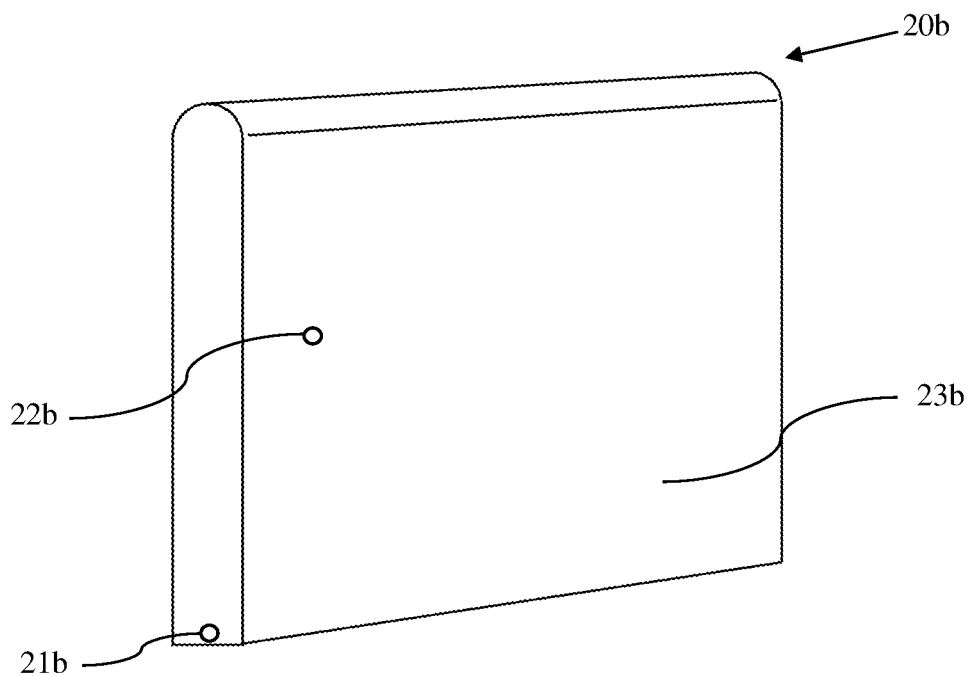
FIG. 8 is an isometric view of a second embodiment of a mixing paddle found in the heating drum.

A second variation of the at least one heating transfer flight 20 is rounded paddle 20b, seen in FIG. 8. Rounded paddle 20ba is formed of induction-responsive material, such as those discussed above, and includes mounting face 21b, leading mixer face 22b, trailing mixer blade face 23b, rounded leading mixer edge 24b, and rounded trailing edge 25b. The flights are attached to the interior of heating drum wall by means known in the art, such as those discussed above.

Paddle 20a, or rounded paddle 20b, operates by collecting asphaltic material on its leading mixer face 22a, as the paddle rotates within heating drum 10. The asphaltic material accumulates on leading mixer face 22a when the flight is at a first position on the lower section of heating drum 10. As the heating drum rotates, paddle 20a changes orientation relative to gravity, and the asphaltic material rolls off the interior wall of the heating drum and accumulates onto leading mixer face 22a as the paddle moves to a second position, perpendicular to the first. As heating drum 10 continues to rotate, paddle 20a moves beyond the second position and the asphaltic material rolls off the leading mixer face and falls onto the bottom of heating drum 10, whereby the asphaltic material may be collected by the paddle or another paddle disposed within the interior of the heating drum.

Example 6

Figure 9:
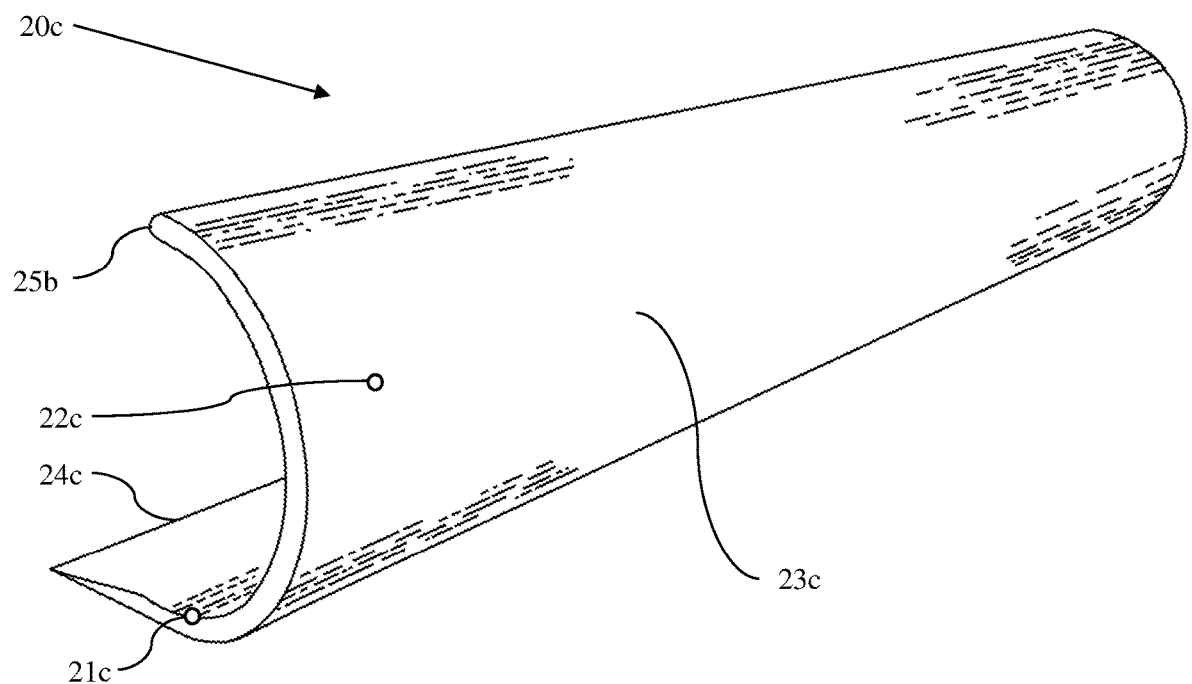
FIG. 9 is an isometric view of a C-shaped heating transfer flight.

The at least one heating transfer flight 20 is C-shaped flight 20c, made of a ferromagnetic material or composite containing ferromagnetic material, and comprised of mounting face 21c, adapted for mounting C-shaped flight 20c to the interior of heating drum wall 11, leading mixer blade 22c, trailing mixer blade face 23c, leading mixer edge 24c, and trailing mixer edge 25c, seen in FIG. 9. C-shaped flights are made of steel pipe cut longitudinally to remove between ¾ and ¼ of the circumferential section of pipe, i.e. retaining ¼ to ¾ of the pipe when viewed in cross-section. The one or more flights are attached to the interior of heating drum wall.

Asphaltic material is collected by leading mixer edge 24c and accumulates in leading mixer face 22c when the flight is at a first position on the lower section of heating drum 10. As heating drum 10 rotates, C-shaped flight 20c moves to a position perpendicular to the first position, the asphaltic material rolls down leading mixer face 22c, providing mixing of the asphaltic material. As heating drum 10 further rotates, asphaltic material further rolls on leading mixer face 22c, until C-shaped flight 20c reaches a third position, where the asphaltic material falls rolls off leading mixer face 22c. In variations where the C-shaped flights do not overlap, the asphaltic material drops to the bottom of the heating drum, where it is collected again. Where the flights overlap, the overlapping of C-shaped flights 20c permits asphalt to fall from leading mixer face 22c of a first flight and onto trailing mixer face 23c of the next C-shaped flight.

Example 7

Figure 10:
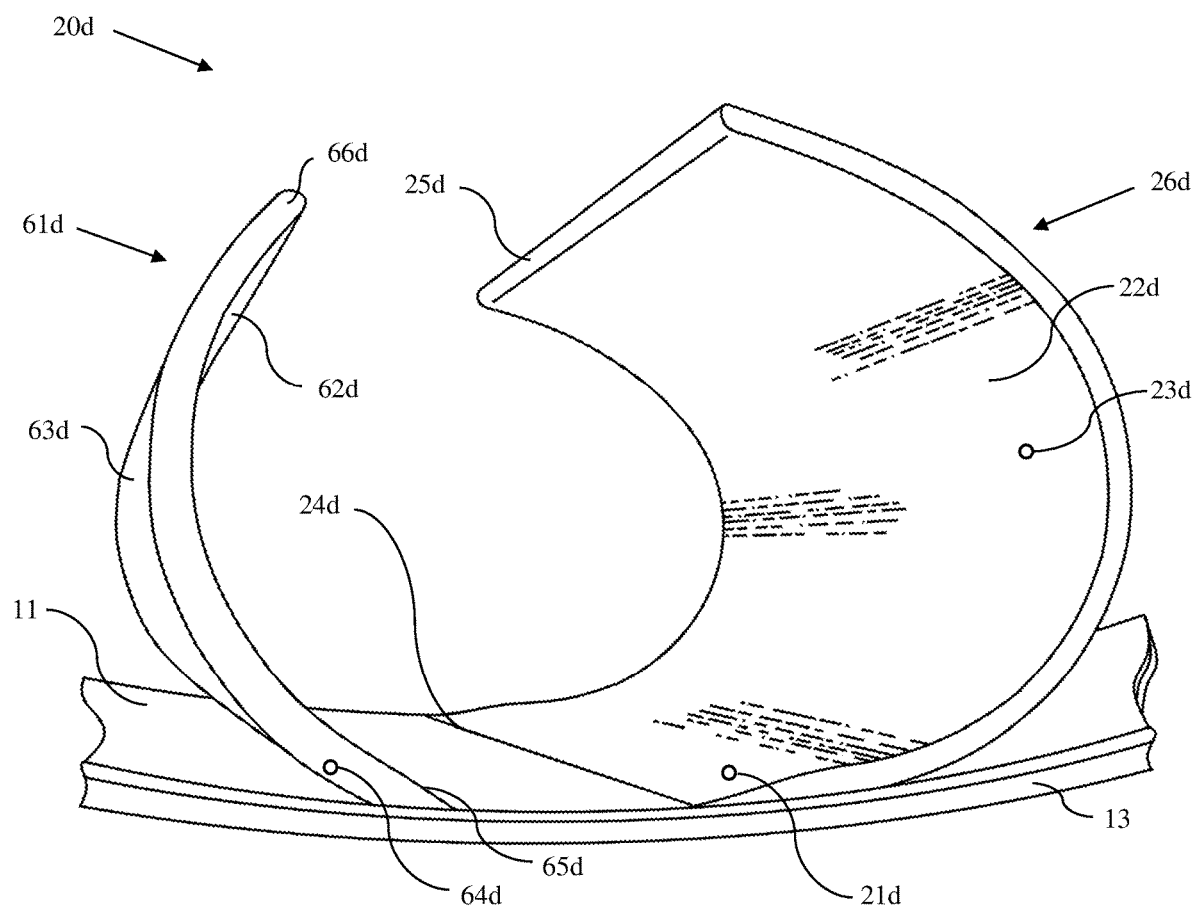
FIG. 10 an isometric view of an embodiment of an independent chi-shaped flight.

The at least one heating transfer flight 20 is chi-shaped flight 20d, made of a ferromagnetic material or composite containing ferromagnetic material, and comprised of leading mixer blade 26d and trailing mixer blade 61d, as seen in FIG. 10. Leading mixer blade 26d is formed of mounting face 21d, adapted for mounting leading mixer blade 26d to the interior of heating drum wall 11, leading mixer blade 22d, trailing mixer blade face 23d, leading mixer edge 24d, and trailing mixer edge 25d. Trailing mixer blade 61d includes trailing mixer face 62d, trailing back face 63d, trailing edge 65d, trailing mounting face 64d, adapted for mounting trailing mixer blade 61d to the interior wall of heating drum 10, and trailing mixer edge 66d. Chi-shaped flight 20d is disposed on the interior of heating drum wall 11, and preferably overlap, as discussed in the heating transfer flights of Example 1. Chi-shaped flights are made of steel pipe cut longitudinally to remove about ¼ to of the circumferential section of pipe, i.e. retaining ¾ to ¼ of the pipe when viewed in cross-section for the leading mixer blade and ¼ to ¾ of the circumferential section of pipe, i.e. retaining ¾ to ¼ of the pipe when viewed in cross-section for the trailing mixer blade. The flights are welded into the interior of heating drum wall. However, other methods of mounting the flight to the interior of the heating drum are also envisioned. Asphaltic material is collected by leading mixer face 22d and accumulates in leading mixer face 23d when the flight is at a first position on the lower section of heating drum 10. As heating drum 10 rotates, the asphalt churns on leading mixer face 23d, providing mixing of the asphaltic material.

Figure 11:
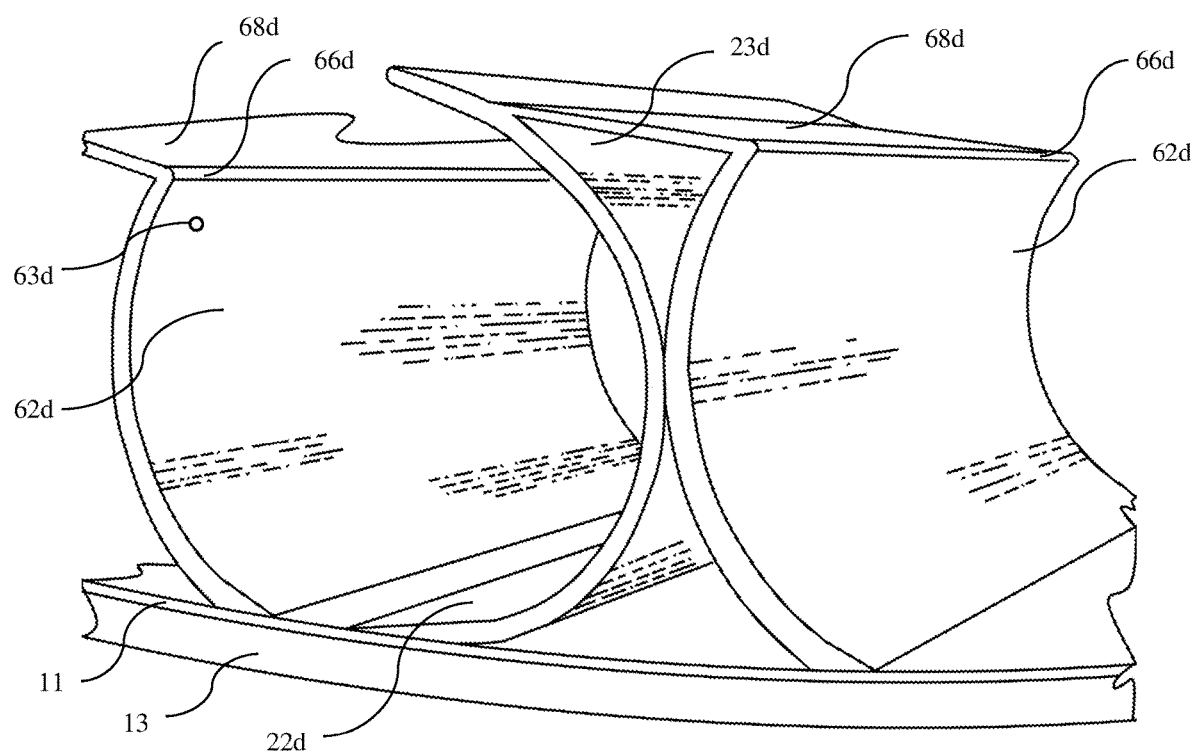
FIG. 11 an isometric view of an embodiment of a fused chi-shaped flight.

In some variations, the adjacent sections of chi-shaped flight 20b are welded, such that a portion of leading trail face 23d of the leading mixer blade and trailing back face 63d of the trailing mixer blade are connected to form a chi-like shape (x), as seen in FIG. 11. Asphalt slide 68d is a section of metal pipe or plate metal welded to the upper edge of leading trail face 23d and trailing back face 63d, permitting any falling asphalt to roll into the mixing blades of the flight. The chi-shaped flights are mounted in heating drum 10 in an overlapping fashion, as disclosed in earlier Examples, and as seen in FIG. 6. As heating drum 10 further rotates, asphaltic material further rolls on leading mixer face 22d, until chi-shaped flight 20b reaches a position, where some asphaltic material falls rolls off leading mixer face 22d. Some asphalt from leading mixer face 22d is retained in the mixer and continues to churn while some falls from leading mixer face 22d of a first flight and into the preceding flight or falls onto asphalt slide 68d and rolls into the flight, where it is collected by trailing mixer face 62d of trailing mixer blade 61d.

Example 8

The at least one heating transfer flight 20 is one or more hollow flights, as seen in FIGS. 12A through 14C, made of a ferromagnetic material or composite containing ferromagnetic material. A first embodiment of a hollow flight is tubular flight 20e, seen in FIG. 12A. Tubular flight is comprised of steel pipe and includes leading mixer blade 22e and trailing mixer blade face 23e. In some variations, a first end of tubular flight 20e is cut at a diagonal relative to the rotational travel, $F_{20}$, of the flight, as seen in FIG. 12B. In other embodiments, the flight is cut at a diagonal relative the to flight's travel and cut diagonal relative to the circumference of the flight, wherein the section adjacent to the heating drum wall is longer than the section adjacent to the interior-most section of the heating drum, as seen in FIG. 12C. In other embodiments, a portion of the flight wall is removed on the leading section of the tubular flight, as seen in FIG. 12D. Tubular flight 20e also may include mounting face 21e, as seen in FIG. 12E. In embodiments having mounting face 21e, a section of tubular flight 20e possesses a different circumference from the remaining sections of the flight. Preferably, mounting face 21e is adapted to mate to the interior wall of heating drum 10, i.e. has the same circumference as heating drum wall 11. The one or more tubular flights are attached to the interior of heating drum wall using mounting face 21e through include welding, adhesives, soldering or other methods disclosed above for connecting the flights to the interior of the heating drum.

Figure 13A:
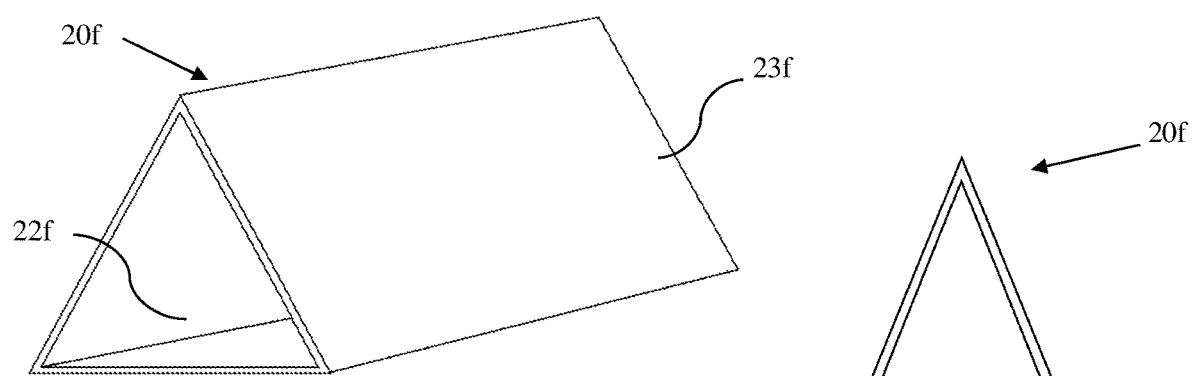
FIG. 13A an isometric view of a first embodiment of a triangular tube flight.
Figure 13B:
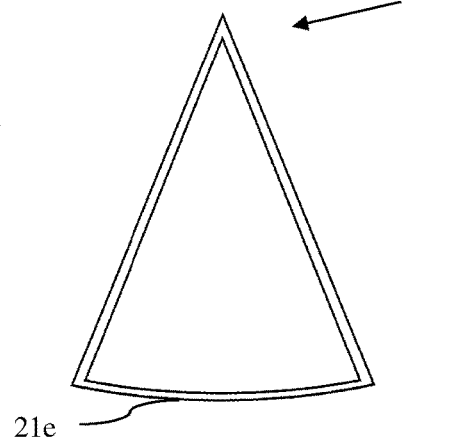
FIG. 13B a cross-sectional view of a second embodiment of a triangular tube flight.

In a second embodiment of a hollow flight is triangular tube flight 20f, seen in FIG. 13A. Triangular tube flight 20f is comprised of steel pipe or three welded steel plates, and includes leading mixer blade 22f and trailing mixer blade face 23f. In some variations, a first end of tubular flight 20f is cut at a diagonal relative to the rotational travel, $F_{20}$, of the flight, or is cut at a diagonal relative to the flight's travel and cut diagonal relative to the circumference of the flight, as disclosed above for tubular flight 20e. In some variations of triangular tube flight 20f, the flight appears pie-shaped in cross section, as seen in FIG. 13B, where the flight includes an arc-shaped of mounting face 21f, adapted for mounting the flight to the interior of heating drum wall 11. In embodiments having mounting face 21f, the mounting face is preferably adapted to complimentarily mate to the interior wall of heating drum 10, i.e. has the same circumference as heating drum wall 11. The one or more tubular flights are attached to the interior of heating drum wall using mounting face 21f through include welding, adhesives, soldering or other methods disclosed above for connecting the flights to the interior of the heating drum.

In a third embodiment of a hollow flight is rectangular tube flight 20g, seen in FIG. 14A. Rectangular tube flight 20g is comprised of rectangular steel pipe or four welded steel plates, and includes leading mixer blade 22g and trailing mixer blade face 23g. In some variations, a first end of tubular flight 20g is cut at a diagonal relative to the rotational travel, $F_{20}$, of the flight, or is cut at a diagonal relative to the flight's travel and cut diagonal relative to the circumference of the flight, as disclosed above for tubular flight 20e. In some variations of triangular tube flight 20f, the rectangular tube flight 20g has an arc-shaped section, as seen in FIG. 14B, where the arc-shaped section forms mounting face 21g, adapted for mounting the flight to the interior of heating drum wall 11. In another embodiment of the flight, the mixing edges are rounded, as seen in FIG. 14C. In embodiments having mounting face 21g the mounting face is preferably adapted to complimentarily mate to the interior wall of heating drum 10, i.e. has the same circumference as heating drum wall 11. The one or more tubular flights are attached to the interior of heating drum wall using mounting face 21g through include welding, adhesives, soldering or other methods disclosed above for connecting the flights to the interior of the heating drum.

Asphaltic material is collected by an opening in the flight and accumulates the asphaltic material in leading mixer face 22 when the flight is at a first position on the lower section of heating drum 10. As heating drum 10 rotates, the flight moves to a position perpendicular to the first position, the asphaltic material rolls down leading mixer face 22e, 22f, or 22g providing mixing of the asphaltic material. As heating drum 10 further rotates, asphaltic material further rolls on the leading mixer face, and is retained in the interior of the flight, until the asphaltic material reaches a second end of the flight and is expelled.

Example 9

Asphalt processor 1 described in Examples 1 through 9 includes mixing flights 40, as seen in FIG. 15. Mixing flights 40 are optionally similar to heating transfer flights 20, such as those described in Examples 5 through 8. Mixing flights may alternatively be fingers, angled paddles, or other flights known in the art. The flights preferably overlap each other, as seen in FIG. 15.

Example 10

Figure 16:
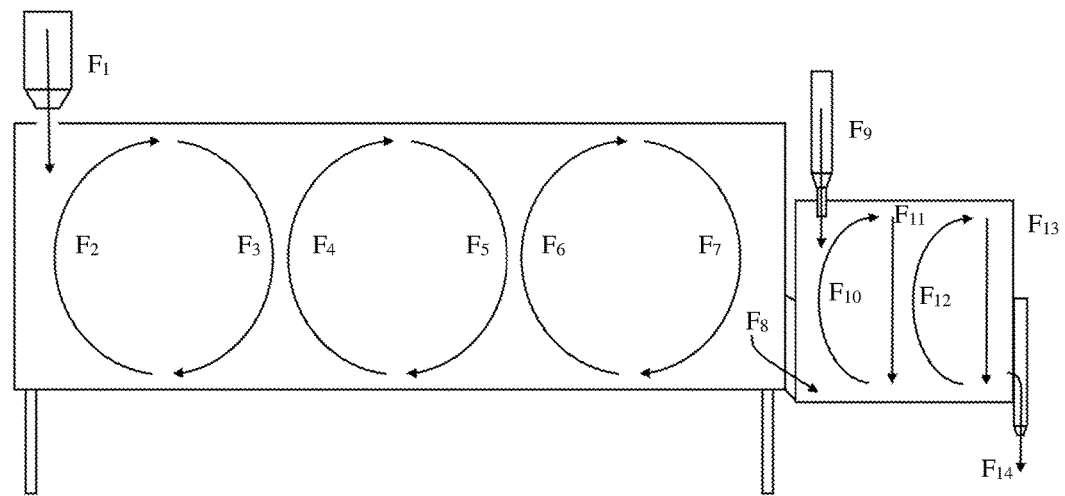
FIG. 16 is a longitudinal cross-sectional view of an embodiment of the asphalt recycling system heating system showing the path of asphalt through the system.

Asphalt processor 1 described in Examples 1 through 9 accepts asphaltic material via heating drum input 17. The asphaltic material travels along path $F_1$, as seen in FIG. 16, and lands onto heating drum wall 11, which acts as an induction plate heating asphaltic concrete. The asphaltic material is moved along by heating drum wall 11 or is collected by the leading face of heating transfer flight 20 and pushed along the interior of heating drum wall 11, traveling path $F_2$. While the asphaltic material travels along path $F_2$, the asphalt is heated by heating transfer flight 20 and heating drum wall 11, and churned by the shape of leading mixer face 22. Heating drum 10 rotates, moving heating transfer flight 20 to a position perpendicular to the first position, where the asphaltic material rolls down of leading mixer face 22. As heating drum 10 further rotates, asphaltic material further rolls on of leading mixer face 22, until the asphaltic material falls off of leading mixer face 22 in embodiments using open faced flights, such as those in FIGS. 7 through 11, and drops onto another heating transfer flight or travels along path $F_3$ onto heating drum wall 11. In embodiments having a closed face, the asphaltic material chruns in the interior of the flight as the asphaltic material travels along path $F_3$. Heating drum 10 rotates further, causing the asphaltic material continues to travel, moving along heating drum 10 to path $F_4$ and $F_5$, then to path $F_6$ and $F_7$. The asphaltic material acts similarly in paths $F_2$, $F_4$, and $F_6$, and similarly in paths $F_3$, $F_5$, and $F_7$. After the asphaltic material has completed its heating in heating drum 10, additives are added to the asphaltic material.

In a first embodiment, the asphaltic material exits the heating drum through heating drum output 18 and travels along path $F_8$ through heating drum transfer 19 to additive mixing system 4, seen in FIG. 2. Additives, such as rejuvenation oils, are injected through additive input 37 into additive mixing drum 30 along path $F_9$, and the heated asphaltic material mixed with the additives by the additive mixing paddles. The asphaltic material and additive land onto the interior wall of additive mixing drum 30 and collected by additive mixing paddle 40a. The asphaltic material is pushed along the interior of mixing drum wall 31, traveling path $F_{10}$. The asphaltic material and additive reach a location in the drum where the asphaltic material and additive fall off additive mixing paddle 40a and drop along path Fit onto the interior of mixing drum wall 31. The material is collected by an additive mixing paddle and moved along path $F_{12}$ until it drops, along path $F_{13}$. The process continues, mixing the asphaltic material and additive, until the material reaches mixing drum output 34, and the material travels along path $F_{14}$ to exit asphalt processor 1.

Figure 17:
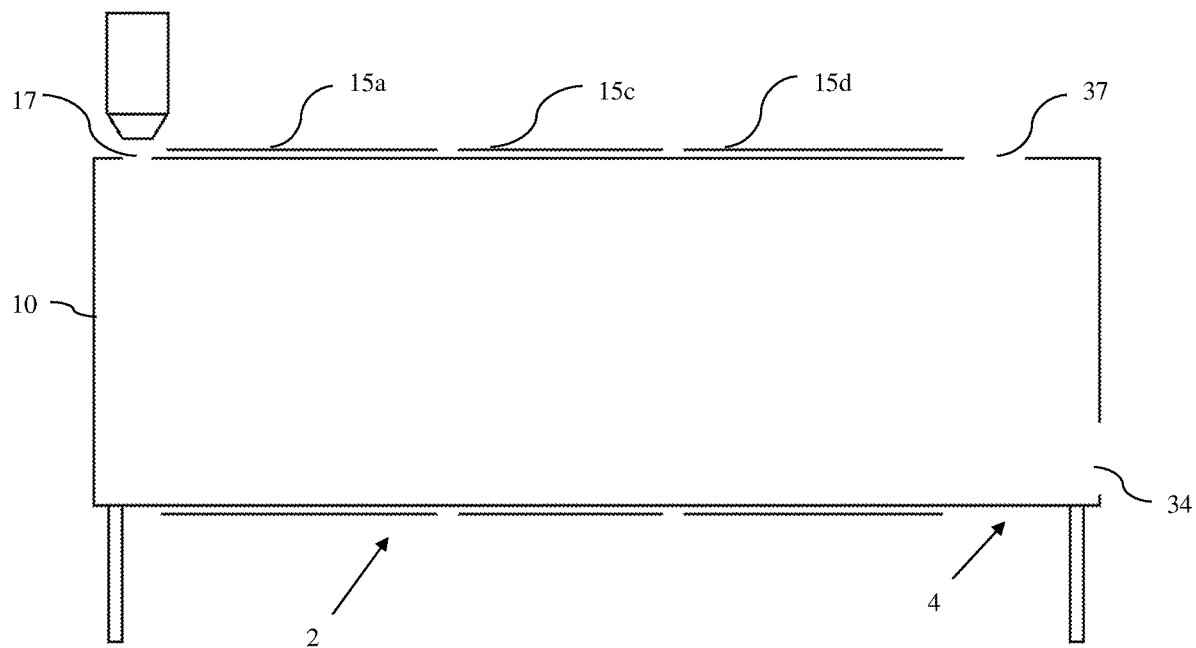
FIG. 17 is a longitudinal cross-sectional view of an embodiment of the asphalt recycling system heating system showing the heating induction system and mixing system in the heating drum.

In a second embodiment, the asphaltic material exits asphalt heating system 2 of heating drum 10, as discussed in Examples 1 through 3. The asphaltic material enters an unheated mixing region at the second end of heating drum 10, which serves as additive mixing system 4, and additives added to the mixing zone of the heating drum, as seen in FIG. 17. Additives, such as rejuvenation oils, are introduced into heating drum output 18 through additive input 37 and into the mixing region of heating drum 10, and the heated asphaltic material mixed with the additives by the interior of the heating drum or by additive mixing paddles. The asphaltic material and additive land onto the interior wall of additive mixing drum 30 and collected by additive mixing paddle 40.

Example 11

Asphalt processor 1 is composed of asphalt heating system 2, induction heating system 3, and additive mixing system 4. Asphalt heating system 2 is composed of heating drum interior 12, heating drum wall 11, and wall insulation 13, as described above, and operates as disclosed in Example 1. Heating drum wall is formed of a ferromagnetic material or composite containing ferromagnetic material, such as CHT400. The wall is optionally insulated with wall insulation 13, such as the wall insulation discussed in Example 1. The interior wall of the heating drum is smooth or optionally possesses rivets and seams. However, this variation does not include heating transfer flights or does not include heating transfer flights in the induction heating system section of the drum.

Induction heating system 3 is adapted to provide heating zone A, heating zone B, heating zone D, and heating zone E, as seen in FIGS. 5 and 17. In this example, induction heating system 3 is composed of first induction heating coil 15a, third induction heating coil 15c, and fourth induction heating coil 15d, each disposed about 5 inches from insulation 13, as discussed in Example 1. The induction coils are formed of an electromagnetic material, such as copper, as disclosed above. First induction heating coil 15a surrounds heating drum 10 in the region defined by heating zone A. Third induction heating coil 15c surrounds heating drum 10 in the region defined by heating zone D, and fourth induction heating coil 15d is disposed in the region defined by heating zone E. Induction heating system 3 therefore provides differential heating in heating drum 10. First induction coil 15a is disposed adjacent to the input opening and elevates the temperature of heating zone A to around 650° F. to quickly heat the asphaltic material for mixing the materials, and is about 8 feet long of flight length. The material is fed onto 45-degree angle straight flights that guide the material into the flights as the drum turns. The rapid heating of the material over this length is designed to dissipate the moisture and heat the material up to about 220° F. Adjacent to heating zone A is heating zone F, which is a region supported by roller trunions that support the drum. Heating zone F is about 2 feet in length, though may differ based on the size of trunions used in the induction heating system 3. This zone has flat 45-degree angle flights to guide the material into heating zone D. Third induction coil 15c elevates the temperature of heating zone D to around 450° F., is about 8 or more feet long of flight length, though varies based on the distance between the first supporting trunions and the second supporting trunions. Where the distance between the first supporting trunions and the second supporting trunions is substantially greater than 8 feet, heating zone D may be split into two heating zones. Fourth heating zone E is disposed adjacent to heating zone D, with fourth induction coil 15d elevating the temperature of heating zone E to between 275° F. and 300° F., to ensure the requisite temperature for paving. Heating zone B is typically not heated, as discussed below, providing a section of the asphalt processor that only mixes the hot asphalt. Fluid additive injector is disposed in heating zone B and additives injected onto the asphaltic material close to the floor and onto the material and the asphalt mix moved through the heating zone by 5 feet of "C"

paddles. The "C" paddles carry the asphalt circumferentially along the drum, concurrently carrying the asphalt mix up and drop it in the drum.

Example 13

Figure 18:
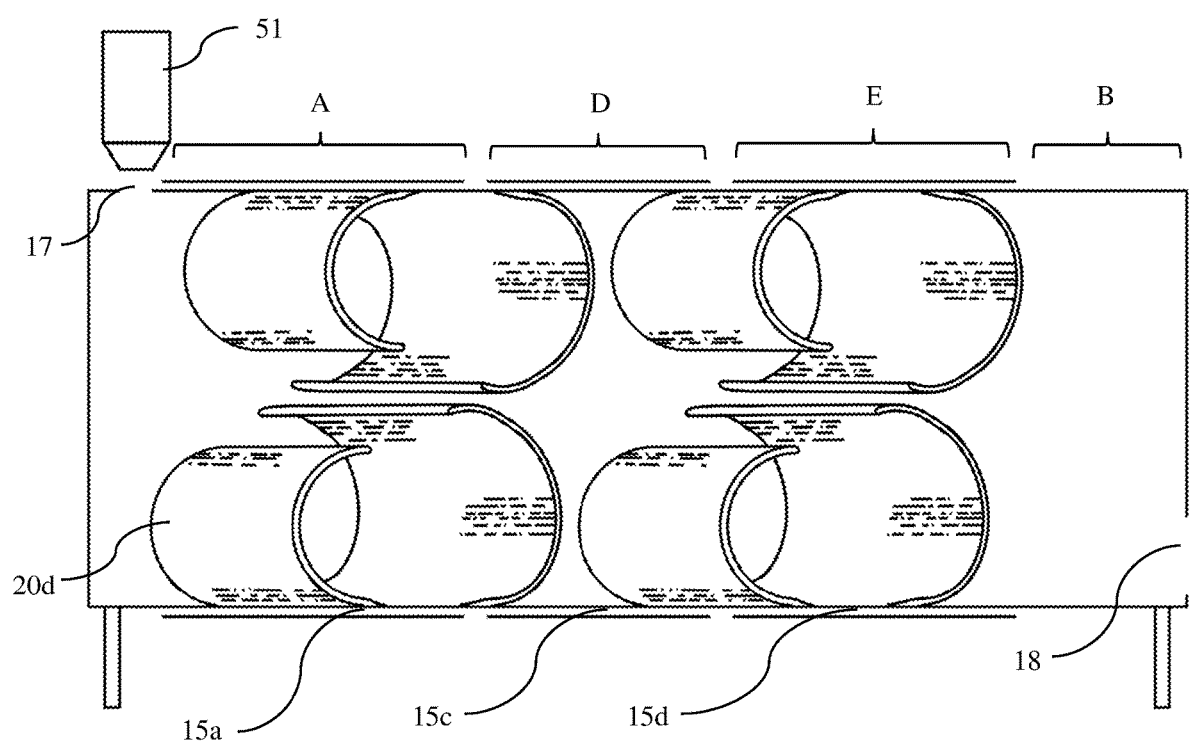
FIG. 18 is a longitudinal cross-sectional view of an embodiment of the asphalt recycling system heating system showing the chi-shaped flights in the heating drum with four heating zones.

Asphalt processor 1 is composed of asphalt heating system 2, and induction heating system 3, as seen in FIG. 18. Asphalt processor 1 is designed to heat RAP, virgin asphalt, a combination of RAP and virgin asphalt. In optional variations, additive mixing system 4 is included, and permits mixing of additives to the asphaltic material, such as rejuvenation oils.

Asphalt heating system 2 is comprised of heating drum 10, formed of heating drum interior 12, heating drum wall 11, and wall insulation 13. The heating drum is rotationally mounted and in communication with a motor designed to rotate the drum. Heating drum wall is formed of a ferromagnetic material or composite containing ferromagnetic material, such as CHT400. The wall is optionally insulated with wall insulation 13, such as the wall insulation discussed in Example 1. Chi-shaped heating transfer flights 20*d* are disposed along the circumferential length of heating drum 10. As heating drum 10 rotates, asphaltic material is collected by chi-shaped heating transfer flights 20*d*, and rolls along the interior wall of the drum, and heats as the asphalt rolls on the interior wall of the heating drum.

Induction heating system 3 is disposed to provide differential heating in heating drum 10, thereby forming heating zones. The system can be designed to provide any number of heating zones from one to twenty, though there is a practical limit to the number of heating zones. In most instances, the heating system is designed to provide from one to five heating zones, such as heating zone A heating zone D, heating zone E, and heating zone B, as seen in FIG. 18. In this example, heating zone A is heated to around to 600° F. to quickly heat the asphaltic material for mixing the materials. Heating zone D is heated to around 350° F. to permit the asphalt to slowly come to the hot mix temperature. Heating zone E is heated to around 320° F. to ensure the requisite temperature for paving, and heating zone B is not heated, providing a section of the asphalt processor that only mixes the hot asphalt. Induction heating system 3 is formed of at least one induction coil 15 disposed outside heating drum 10. In the Example, induction heating system 3 is formed of first induction coil 15*a*, third induction heating coil 15*c*, and fourth induction heating coil 15*d*. In optional embodiments, second induction heating coil 15*b* is provided in heating zone B, as discussed in earlier Examples. The induction coils are formed of an electromagnetic material, such as copper, having the ability to generate magnetic fields upon application of electricity to the coil. The induction coil is disposed about 5 inches from wall insulation 15, where used, and preferably encircles heating drum 10.

An optional additive mixing system 4 is comprised of additive mixing drum 30, additive bin 35, additive mixer 40, and additive mixing output 34, as described in previous Examples. As in the Examples, additive mixing system 4 can be heated or unheated, and can include various additive mixers, as described previously.

Example 14

Figure 19:
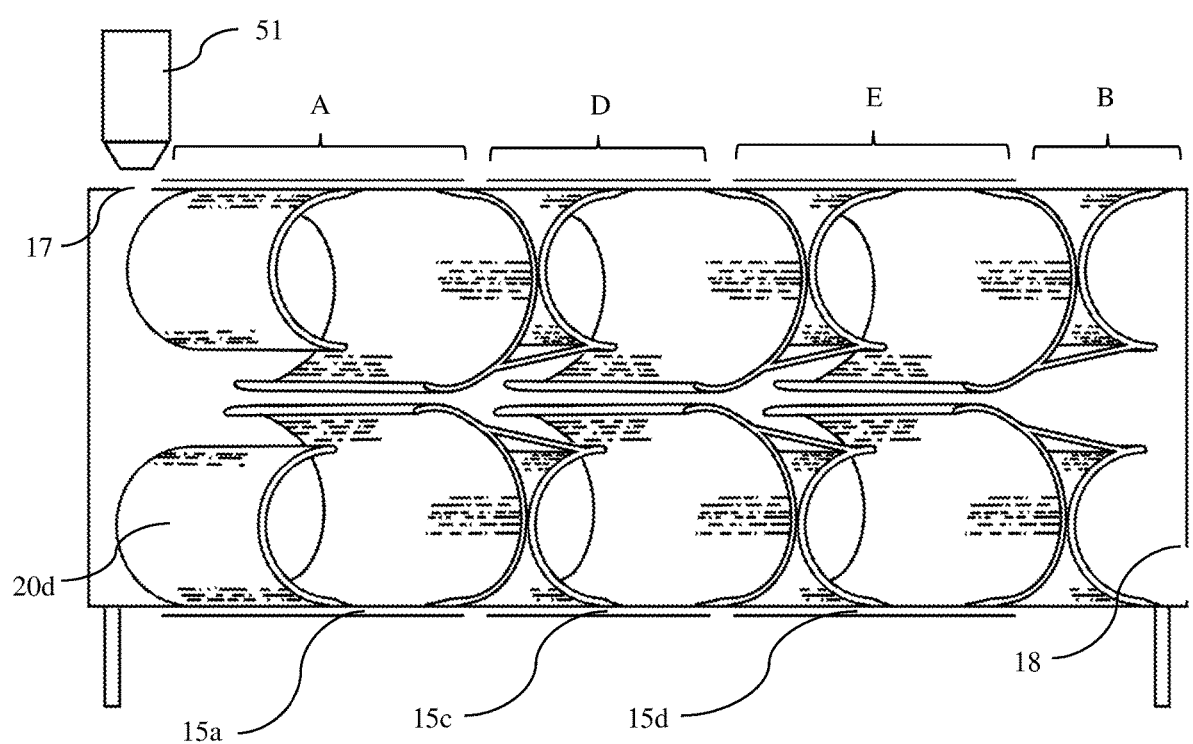
FIG. 19 is a longitudinal cross-sectional view of an embodiment of the asphalt recycling system heating system showing the fused chi-shaped flights in the heating drum with four heating zones.

Asphalt processor 1 is composed of asphalt heating system 2, and induction heating system 3, as seen in FIG. 19. Asphalt processor 1 is designed to heat RAP, virgin asphalt, a combination of RAP and virgin asphalt. In optional variations, additive mixing system 4 is included, and permits mixing of additives to the asphaltic material, such as rejuvenation oils.

Asphalt heating system 2 is comprised of heating drum 10, formed of heating drum interior 12, heating drum wall 11, and wall insulation 13. The heating drum is rotationally mounted and in communication with a motor designed to rotate the drum. Heating drum wall is formed of a ferromagnetic material or composite containing ferromagnetic material, such as CHT400. The wall is optionally insulated with wall insulation 13, such as the wall insulation discussed in Example 1. A plurality of modified chi-shaped heating drum paddles, as seen in FIG. 11, are disposed on the interior wall of the heating drum. Heating drum paddles 20*d* are welded into the interior of heating drum wall. Asphaltic material is collected by leading mixer edge 24*d* and accumulates in leading mixer face 22*d* when the paddle is at a first position on the lower section of heating drum 10. As heating drum 10 rotates, heating drum paddle 20*d* moves to a position perpendicular to the first position, the asphaltic material rolls onto leading mixer face 22*d*. As heating drum 10 further rotates, asphaltic material further rolls off leading mixer face 22*d*, where the asphaltic material falls rolls off leading mixer face 22*d* and onto the interior wall of heating drum 10 providing mixing of the asphaltic material.

Induction heating system 3 is disposed to provide differential heating in heating drum 10, thereby forming heating zones. The system can be designed to provide any number of heating zones from one to twenty, though there is a practical limit to the number of heating zones. In most instances, the heating system is designed to provide from one to five heating zones, such as heating zone A heating zone D, heating zone E, and heating zone B. In this example, heating zone A is heated to around to 500° F. to quickly heat the asphaltic material for mixing the materials. Heating zone D is heated to around 325° F. to permit the asphalt to slowly come to the hot mix temperature. Heating zone E is heated to around 300° F. to ensure the requisite temperature for paving, and heating zone C is not heated, providing a section of the asphalt processor that only mixes the hot asphalt. Induction heating system 3 is formed of at least one induction coil 15 disposed outside heating drum 10. In the Example, induction heating system 3 is formed of first induction coil 15*a*, third induction heating coil 15*c*, and fourth induction heating coil 15*d*. In optional embodiments, second induction heating coil 15*b* is provided in heating zone B, as discussed in earlier Examples. The induction coils are formed of an electromagnetic material, such as copper, having the ability to generate magnetic fields upon application of electricity to the coil. The induction coil is disposed about 5 inches from wall insulation 15, where used, and preferably encircles heating drum 10.

An optional additive mixing system 4 is comprised of additive mixing drum 30, additive bin 35, additive mixer 40, and additive mixing output 34, as described in previous Examples. As in the Examples, additive mixing system 4 can be heated or unheated, and can include various additive mixers, as described previously.

Example 15

Figure 20:
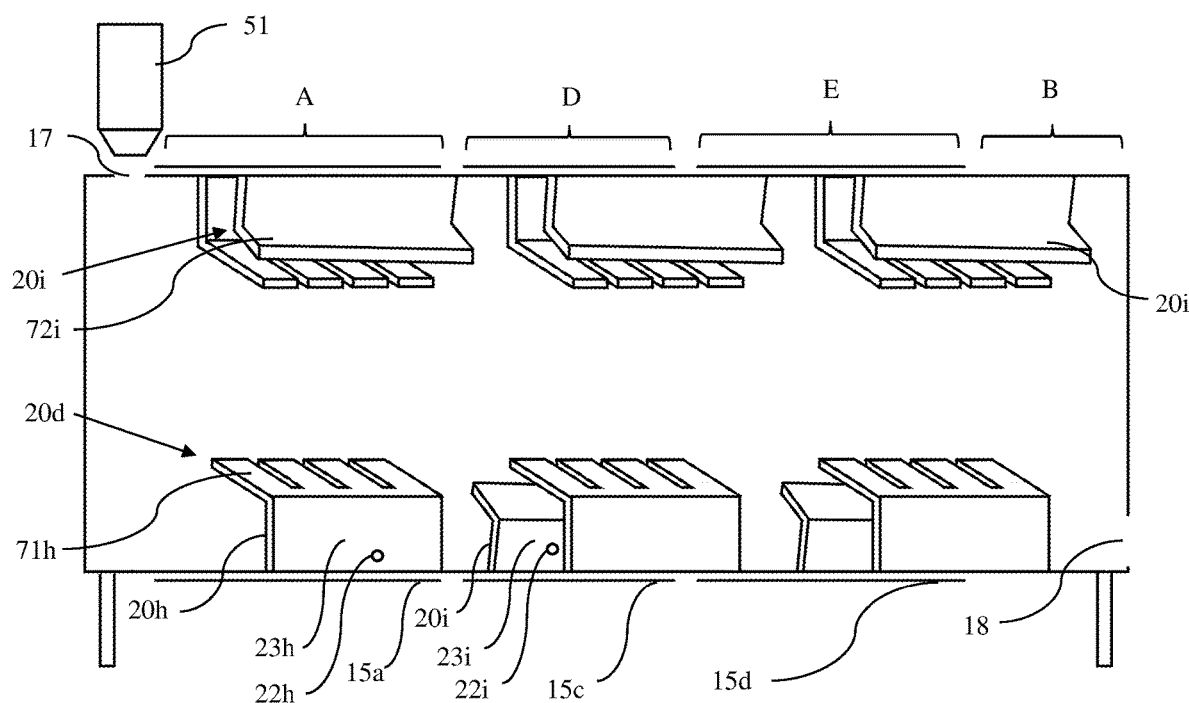
FIG. 20 is a longitudinal cross-sectional view of an embodiment of the asphalt recycling system heating system showing angled flights and fingered flights in the heating drum with four heating zones.

Asphalt processor 1 is composed of asphalt heating system 2, and induction heating system 3, as seen in FIG. 20. Asphalt processor 1 is designed to heat RAP, virgin asphalt, a combination of RAP and virgin asphalt. In optional variations, additive mixing system 4 is included, and permits mixing of additives to the asphaltic material, such as rejuvenation oils.

Asphalt heating system 2 is comprised of heating drum 10, formed of heating drum interior 12, heating drum wall 11, and wall insulation 13. The heating drum is rotationally mounted and in communication with a motor designed to rotate the drum. Heating drum wall is formed of a ferromagnetic material or composite containing ferromagnetic material, such as CHT400. The wall is optionally insulated with wall insulation 13, such as the wall insulation discussed in Example 1. A plurality of finger-shaped flights 20h and angled flights 20i are disposed on the interior wall of the heating drum. Finger-shaped flights 20h and angled flights 20i are preferably made of a ferromagnetic material or composite containing ferromagnetic material. Finger-shaped flights 20h are comprised of mounting edge 21h, adapted for mounting finger-shaped flights 20h to the interior of heating drum wall 11, mixing face 22h and leading trail face 23h and a plurality of mixing fingers 71h disposed on an edge of the mixing blade and at an angle to the mixing blade. Angled flights 20i are comprised of a mixing blade that further comprises leading mixing face 22i and leading trail face 23i, and mounting edge 21i, adapted for mounting finger-shaped flights 20i to the interior of heating drum wall 11. Angled blade 72i is disposed on an edge of the mixing blade and at an angle to the mixing blade. The finger-shaped flights and angled flights are welded into the interior of heating drum wall using the mounting face. Asphaltic material is collected by leading mixer face 22h and 22i, and accumulates on the leading mixing face when the finger-shaped flights and angled flights are at a first position on the lower section of heating drum 10. As heating drum 10 rotates, finger-shaped flights 20h and angled flights 20i move to a position perpendicular to the first position, the asphaltic material rolls onto leading mixing face 22h and 22i. As heating drum 10 further rotates, asphaltic material further rolls off the leading mixing face, and onto the interior wall of heating drum 10 providing mixing of the asphaltic material.

Induction heating system 3 is disposed to provide differential heating in heating drum 10, thereby forming heating zones. The system can be designed to provide any number of heating zones from one to twenty, though there is a practical limit to the number of heating zones. In most instances, the heating system is designed to provide from one to five heating zones, such as heating zone A heating zone D, heating zone E, and heating zone B. In this example, heating zone A is heated to around to 550° F. to quickly heat the asphaltic material for mixing the materials. Heating zone D is heated to around 360° F. to permit the asphalt to slowly come to the hot mix temperature. Heating zone E is heated to around 320° F. to ensure the requisite temperature for paving, and heating zone C is not heated, providing a section of the asphalt processor that only mixes the hot asphalt. Induction heating system 3 is formed of at least one induction coil 15 disposed outside heating drum 10. In the Example, induction heating system 3 is formed of first induction coil 15a, third induction heating coil 15c, and fourth induction heating coil 15d. In optional embodiments, second induction heating coil 15b is provided in heating zone B, as discussed in earlier Examples. The induction coils are formed of an electromagnetic material, such as copper, having the ability to generate magnetic fields upon application of electricity to the coil. The induction coil is disposed about 5 inches from wall insulation 15, where used, and preferably encircles heating drum 10.

An optional additive mixing system 4 is comprised of additive mixing drum 30, additive bin 35, additive mixer 40, and additive mixing output 34, as described in previous Examples. As in the Examples, additive mixing system 4 can be heated or unheated, and can include various additive mixers, as described previously.

Example 16

Figure 21:
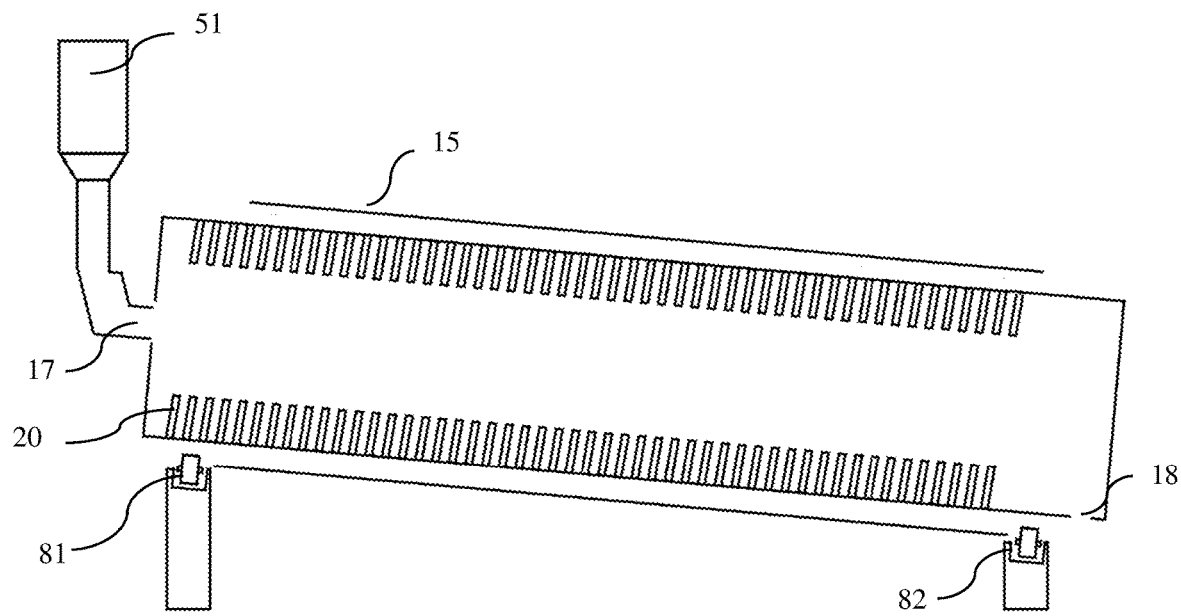
FIG. 21 is a longitudinal cross-sectional view of an embodiment of the asphalt recycling system heating system showing the heating drum with a central hopper and two heating zones.

Asphalt processor 1 is composed of heating system 2, induction heating system 3, and additive mixing system 4, as seen in FIG. 21. Asphalt processor 1 is designed to heat RAP, virgin asphalt, a combination of RAP and virgin asphalt, and optionally additives, i.e. asphaltic material, to the requisite temperature for paving applications.

Heating system 2 is comprised of heating drum 10, oriented at angle $\theta_A$. Angle $\theta_A$ is selected to allow asphaltic material to roll to bottom of heating drum 10 at a preferred rate of 6 to 8 inches per rotation, such as a decline of 7° to 10°. However, the angle can differ based on the viscosity of the asphaltic material, speed of the heating drum rotation, gravity, humidity and other environmental factors surrounding and within the heating drum. Heating drum 10 is formed of heating drum interior 12, heating drum wall 11, and heating flights 20. Heating drum wall 11 is formed of a ferromagnetic material or composite containing ferromagnetic material, such as CHT400, and is optionally 1 inch in thickness. The heating drum is supported by first drum support 81 and second drum support 82, such as trunions. The heating flights are bolted into the interior of heating drum wall.

Example 17

Figure 22:
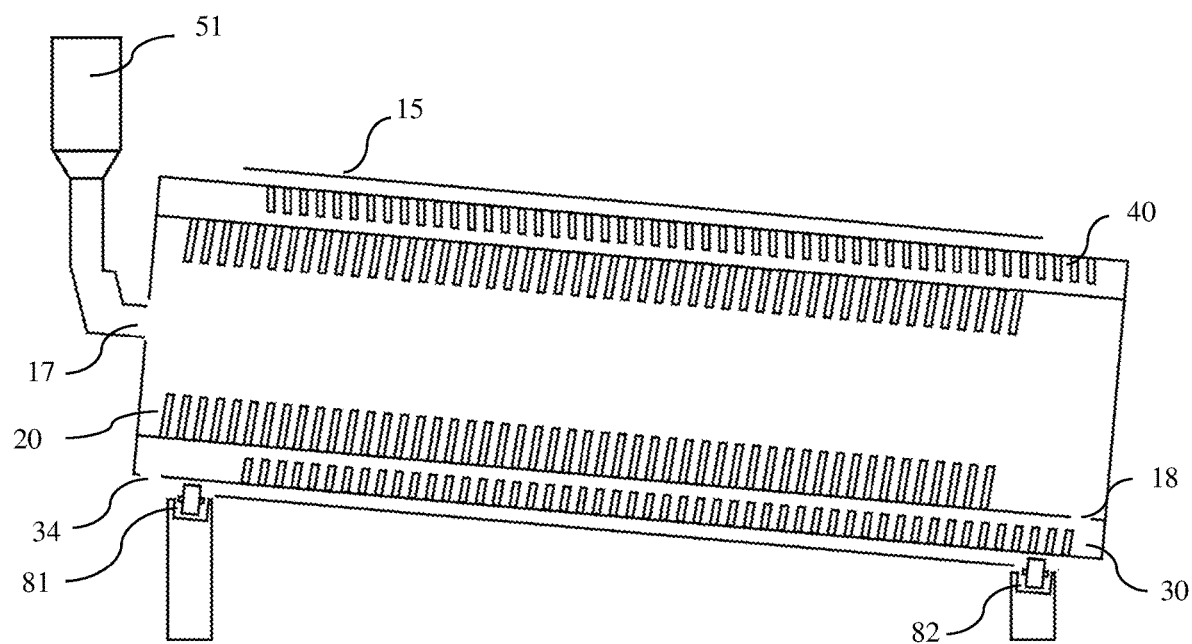
FIG. 22 is a longitudinal cross-sectional view of an embodiment of the asphalt recycling system heating system showing the heating drum with a central hopper, concentric mixing drum and two heating zones.

Asphalt processor 1 is composed of heating system 2, induction heating system 3, and additive mixing system 4, as seen in FIG. 22. Asphalt processor 1 is designed to heat RAP, virgin asphalt, a combination of RAP and virgin asphalt, and optionally additives, i.e. asphaltic material, to the requisite temperature for paving applications.

Figure 23:
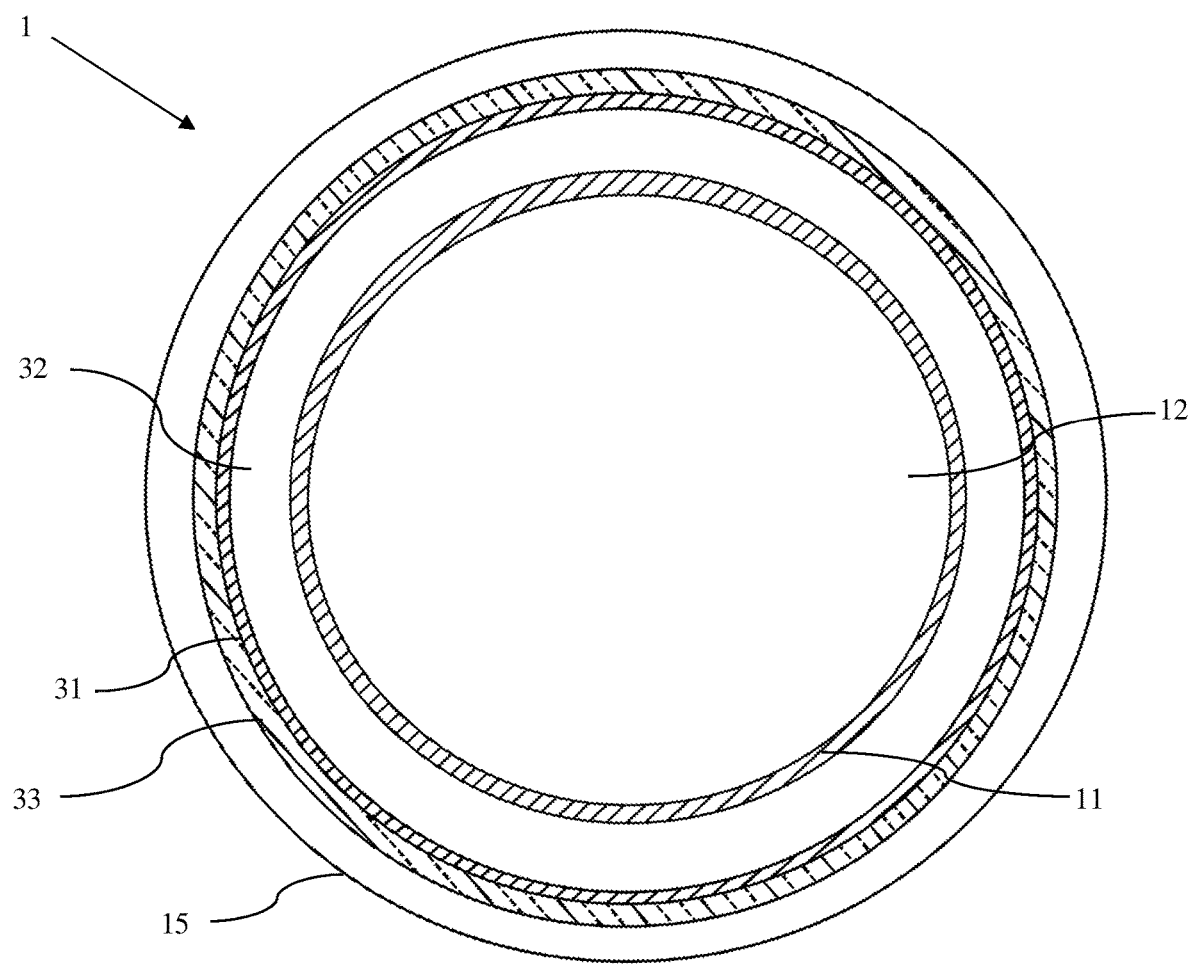
FIG. 23 is a cross-sectional view of an embodiment of the asphalt recycling system heating system showing the heating drum with a central hopper, and mixing drum concentrically disposed over the heating drum.

Heating system 2 is comprised of heating drum 10, oriented at angle $\theta_A$. Angle $\theta_A$ is selected to allow asphaltic material to roll to bottom of heating drum 10 at a preferred rate of 6 to 8 inches per rotation, such as a decline of 7° to 10°. However, the angle can differ based on the viscosity of the asphaltic material, speed of the heating drum rotation, gravity, humidity and other environmental factors surrounding and within the heating drum. Heating drum 10 is formed of heating drum interior 12, heating drum wall 11, and heating flights 20. Heating drum wall 11 is formed of a ferromagnetic material or composite containing ferromagnetic material, such as CHT400, and is optionally 1 inch in thickness, as seen in FIG. 23. Alternatively, the ferromagnetic material is covered in insulation, such as those described above, and encased in a non-magnetic metal. The heating flights are bolted into the interior of heating drum wall.

The heating drum is encircled by mixing drum 30, such that mixing drum 30 is circumferential to heating drum 10, as seen in FIG. 23. Aggregate, RAP, asphalt, or a combination thereof is added to heating drum 10 at a first end of the heating drum using heating drum input 17. One or more heating drum output 18 are disposed on the wall of the heating drum at the second end of heating drum 10. Mixing drum 30 includes a plurality of additive mixers 40, oriented to move asphaltic material toward one or more additive mixing output 34. Mixing drum 30 is supported by first trunion 81 and second trunion 82, and is rotationally mounted and in communication with a motor designed to rotate the drum. Mixing drum 30 is covered in mixing wall insulation 33, formed of Fiberfax® alumina-silica insulation, or other high-temperature insulation, and disposed on the exterior of mixing wall 31 to limit heat transfer and escape from asphalt processor 1. Mixing wall insulation 33 can vary in thickness, though a thickness of 1 to 2 inches is sufficient to limit a substantial amount of heat loss.

Induction heating system 3 is optionally disposed to provide differential heating in heating drum 10, thereby forming segregated heating zones, such as heating zone A and heating zone B.

Example 18

Figure 24:
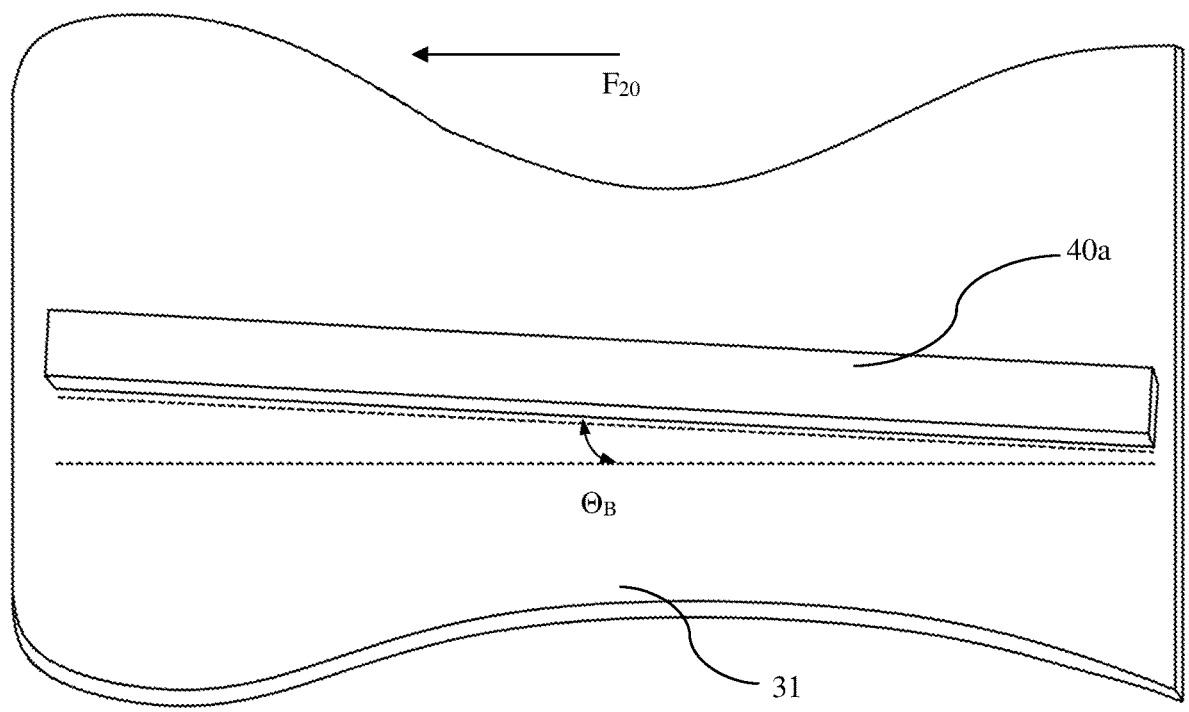
FIG. 24 is a top-down isometric view of an embodiment of an additive mixer, shown as a mixing paddle.

Variations of additive mixing system 4, disclosed in Examples 1, 3, and 5, provide for additive mixer flights 40 disposed at angle $\theta_B$, as seen in FIG. 24. Additive mixer flight 40 is attached to the interior of mixing drum wall 31 such that a first end of additive mixer 40 is disposed ahead of a second end of additive mixer 40 when viewed from above. Preferably, the first end of additive mixer 40 is directed toward rotational movement $F_{21}$ of the heating drum, and the second end of additive mixer 40 is directed away from rotational movement $F_{21}$, as seen in FIG. 24. Angle $\theta_B$ is selected to facilitate movement of the asphaltic material toward the second end of mixing drum 30. For example, an angle of 2° to 7° is envisioned, assisting in moving the asphaltic material at a preferred rate of 6 to 8 inches per rotation. However, the angle can differ based on the viscosity of the asphaltic material, speed of the heating drum rotation, gravity, humidity and other environmental factors.

Example 19

Figure 25:
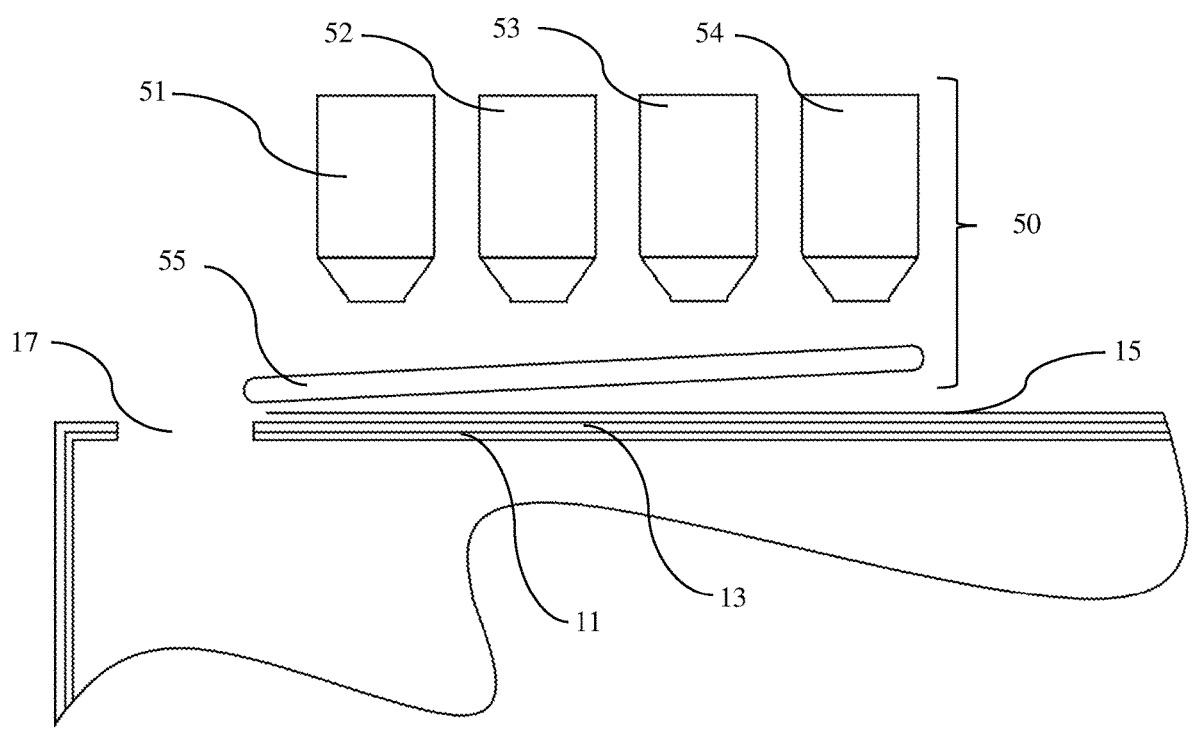
FIG. 25 is a plan view of an embodiment of an additive delivery system attached to the mixing drum.

Variations of the asphalt heating system 2, disclosed in the previous Examples, provide for asphaltic material delivery system 50, as seen in FIG. 25, allowing asphalt processor 1 to be integrated into a system for preparing asphaltic concrete. At least one component bin, such as asphalt cement tank 51, coarse aggregates bin 52, and medium aggregates bin 53, and fine aggregates bin 54, are disposed upstream of asphalt heating system 2, i.e. disposed to permit unloading of the at least one component from its bin into heating drum input 17. The at least one component bin is connected to heating drum input 17 through component conveyor 55. The at least one component bin possesses an output end disposed adjacent to component conveyor 55, thereby leading to heating drum input 17, as seen in FIG. 25.

Example 20

Recycled asphaltic concrete is processed for use through asphalt processor 1. Collected RAP is placed into an asphaltic concrete bin. Additional components of the asphaltic concrete are placed in other bins, such as coarse aggregates bin 52, and fine aggregates bin 53. For example, the aggregates components may be 3% of ⅜ inch aggregates, 5% of ½ inch aggregates, and 5% of #50 sieve aggregates. Other optional components include ground shingle material, and are optionally placed in a bin, as seen in FIG. 25. Aggregates of various sizes can be added to meet a particular mixture composition's volumetric requirements. For example, RAP and virgin asphalt cement can be combined with the aggregates material and processed through asphalt processor 1 as described above.

Prior to loading of the asphaltic concrete mix into intake 17 of asphalt processor 1, a predetermined quantity of RAP and coarse and fine aggregates, i.e., sand and aggregates, are measured and transferred to intake 17 via component conveyor 55. Optionally, asphalt cement is added to increase the amount of asphalt cement in the asphaltic concrete. The RAP and aggregates material are mixed and heated in heating drum 10, through the action of rotating drum and the heating transfer flights 20, which mixes the components by churning the mix. During the mixing, the asphaltic concrete initially heated quickly to around 220° F., to vaporize water from the RAP. The asphaltic concrete was then heated to around 350° F. in a second heating zone heated, and churned in the heating zone to mix the asphaltic concrete to a substantially uniform consistency and temperature. The asphaltic concrete was then moved to a third heating zone heated to between 275° F. and 300° F., and an optional unheated fourth zone. The asphalt concrete mix is moved along the inducted walls of the heating drum and any flights or paddles, thereby providing a consistent heating source for the asphaltic concrete.

The uniform heating of the used asphaltic concrete, due to the induction heating and mixing of the asphaltic concrete in asphalt processor 1, prevents moisture from surging from the RAP and also helps to maintain the integrity of the subsequently formed rejuvenated asphalt cement. In this manner, surges of steam do not disrupt the recycling process. Further, the gradual heating reduces the likelihood of RAP fracture from violent surges of moisture loss. The asphaltic concrete exits heating drum 10 through heating drum output 18 and is immediately transferred to additive mixing drum 30.

The asphaltic concrete is collected in additive mixing drum 30 by additive mixers 40 and rejuvenating oil added to restore the biding properties of the RAP. The rejuvenating oil reduces oxidation of the asphalt cement resulting in more elastic and flexible asphalt binder, returning the asphalt cement to original state when it was originally manufactured. During additive mixing, the asphaltic material is tested for Air Void (AV) content to determine the volumetric properties of the RAP recycled mix. The AV target mix design is 4% with a production envelope of +/−2%. The AV content tests the space between the aggregate particles, not the air space within the aggregate particles, to ensure the asphaltic material is not saturated with asphalt. Increasing the Asphalt Cement (AC) content within the mix reduces the AV content as AC will partially fill some of the AV space and the AV will fail the volumetric testing, resulting in the road surface bleeding and flushing, which causes the road to rut and makes it slick and slippery in wet conditions. During addition of rejuvenation oils, the oils increase the AC and consequently reduce the AV, which can fall below the minimum of 2%. To correct this, a stone particle, washed 50 mesh and 30 mesh granite or limestone product, is added to the asphaltic material during mixing. Testing has shown this stone particle restores the AV to the desired content and brings the test result within the envelope of acceptance.

The RAP is further mixed and heated through induction heat applied via mixing induction coil 16 to a final asphalt work mix. For example, the work mix leaves additive mixing drum 30 at between 300° F. and 400° F. to ensure the work mix reaches the job site at around 290° F.

Example 21

Virgin asphalt is processed for use through asphalt processor 1. The liquid virgin cement is placed into asphalt cement tank 51 and additional components added in storage bins, such as coarse aggregates bin 52, and fine aggregates bin 53, as described above. A predetermined quantity of asphalt cement and coarse and fine aggregates are measured and transferred to intake 17 via component conveyor 55, where the asphalt cement and aggregates material are mixed in heating drum 10, as described above. During the mixing, the asphaltic concrete is heated to about 325° F. through induction heating. The asphaltic concrete exits heating drum 10 through heating drum output 18 and is immediately transferred to additive mixing drum 30.

Additional aggregates or asphalt cement can be added to meet a particular mixture composition's volumetric requirements. For example, additional virgin asphalt cement can be processed through asphalt processor 1 as described above, and added.

The virgin asphalt cement and aggregates material is further mixed and heated through induction heat applied via mixing induction coil 16 to a final asphalt work mix. For example, the work mix leaves additive mixing drum 30 at between 300° F. and 400° F. to ensure the work mix reaches the job site at around 290° F.

Example 22

Virgin asphalt is processed for use through asphalt processor 1. The liquid virgin asphalt cement is placed into asphalt cement tank 51 and additional components added in other bins, such as coarse aggregates bin 51, and fine aggregates bin 52, as described in Example 18. A predetermined quantity of asphalt cement and coarse and fine aggregates are measured and transferred to intake 17 via component conveyor 55, where the asphalt cement and aggregates material are mixed in heating drum 10, as described above. During the mixing, the asphaltic concrete is heated to about 250° F., with a 10% variation, through induction heating to form a warm asphaltic concrete. The asphaltic concrete exits heating drum 10 through heating drum output 18 and is immediately transferred to additive mixing drum 30.

Additional aggregates or asphalt cement can be added to meet a particular mixture composition's volumetric requirements. For example, additional virgin asphalt can be processed through asphalt processor 1 as described above, and added.

The virgin asphalt cement and aggregates material is further mixed and heated through induction heat applied via mixing induction coil 16 to a final asphalt work mix. For example, the work mix leaves additive mixing drum 30 at between 225° F. and 320° F. to ensure the work mix reaches the job site at around 220° F.

Example 24

A combination of recycled asphaltic concrete and virgin asphalt cement is processed for use through asphalt processor 1. Collected RAP is placed into an asphaltic concrete bin, with virgin asphalt cement placed into asphalt tank 90. Additional components of the asphaltic concrete, as described above, are placed in other bins, such as coarse aggregates bin 52, and fine aggregates bin 53. A combination of virgin asphalt cement and RAP are loaded into asphalt processor 1, along with aggregates material. The RAP and virgin asphalt can be provided in any ratio, such as 90% RAP and 10% virgin asphalt cement.

The asphalt and aggregates material are loaded into asphalt processor 1 and mixed in heating drum 10, using S-shaped flights 20, as described previously. The asphaltic concrete exits asphalt processor 1 through heating drum output 18. In some embodiments, the hot asphalt mix is immediately transferred to additive mixing drum 30.

Rejuvenating oil added to improve the rheological properties of the asphalt cement the binding properties of the RAP. Additional aggregates of various sizes can be added to meet a particular mixture composition's volumetric requirements. In the event more binder is required, virgin asphalt or rejuvenated RAP is added. The RAP is mixed and heated through induction heat applied via mixing induction coil 16 to a final asphalt work mix. The work mix leaves additive mixing drum 30 at between 300° F. and 400° F. to ensure the work mix reaches the job site at around 290° F.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosure of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall therebetween.

What is claimed is:

1. A method of manufacturing an asphaltic concrete, comprising:
    providing an asphalt, wherein the asphalt is asphaltic concrete or asphalt cement;
    providing an asphalt processing system, comprising:
        a heating drum, wherein the heating drum further comprises:
            a tubular or conal wall, encompassing an interior and having a first end and a second end;
                wherein the tubular or conal wall is composed of a magnetic material which heats upon exposure to magnetic forces;
            an input opening disposed adjacent to the first end of the tubular or conal wall;
            an output opening disposed adjacent to the second end of the tubular or conal wall;
        a heating system, comprising:
            at least a first heating source, wherein the at least first heating source is disposed on an outside of the tubular or conal wall and disposed to direct heat to the tubular or conal wall; and
        a drive system in communication with the heating drum which rotates rotate the heating drum;
    rotating the heating drum about a central axis;
    activating the heating system to apply heat to the tubular or conal wall of the heating drum;
    placing an asphaltic concrete mix into the heating drum, wherein the tubular or conal wall of the heating drum is heated to between 300° F. and 750° F.;
    moving the asphaltic concrete mix along the heating drum, wherein the asphaltic concrete mix is mixed while moving;
    heating the asphaltic concrete mix to between 300° F. and 350° F. to form a heated mix; and
    expelling the heated mix from the asphalt processing system.

2. The method of claim 1, further comprising:
providing the heating system, wherein the heating system is an induction heating system, comprising:
at least a first induction heating coil disposed in the exterior of the heating drum at a first position, and in magnetic communication with the magnetic material of the heating drum and the magnetic material of the S-shaped flights; and
applying a magnetic field to the induction heating system to heat magnetic material of the heating drum.

3. The method of claim 1, wherein the asphaltic concrete mix comprises reclaimed asphalt pavement, virgin asphalt or a combination thereof.

4. The method of claim 1, further comprising:
mixing the asphaltic concrete mix inside the heating drum using a mixing flight, wherein the mixing flight comprises at least one heating transfer flight disposed on the interior face of the tubular or conal wall, wherein the at least one heating transfer flight is an S-shaped flight, paddle, finger-shaped flight, angled flight, chi-shaped flight, or a combination thereof;
where the least one heating transfer flight is composed of a magnetic material which heats upon exposure to magnetic forces;
wherein the S-shaped flight further comprises:
a leading blade formed of a leading tubular arc, where the tubular arc comprises a 160° to 300° arc when viewed in cross-section, and comprising:
a leading edge disposed on a first edge of the leading blade;
a mounting edge disposed adjacent to the leading edge;
a connecting edge disposed on a second edge of the leading blade;
A trailing blade formed of a trailing tubular arc, where the tubular arc comprises a 160° to 300° arc when viewed in cross-section, and comprising:
a connecting edge disposed on a first edge of the trailing blade;
a trailing edge disposed on a second edge of the trailing blade;
wherein the connecting edge of the leading blade is connected to the connecting edge of the trailing blade;
wherein the S-shaped flight is disposed on the interior of the tubular or conal wall at the mounting edge;
wherein the paddle further comprises:
a cuboidic mixing bar, wherein the cuboidic mixing bar has a mixing face, trailing face, first edge face, second edge face and mounting face;
wherein the mixing face and trailing face are rectangular, and have a first edge, a mounting edge, a second edge, and a mixing edge;
wherein the first edge face is disposed on the first edge of the mixing face and trailing face, and the second face is disposed on the second edge of the mixing face and trailing face;
where the first edge face is square or rectangular and the second edge face is square or rectangular;
wherein the paddle is disposed on the interior of the tubular or conal wall at the mounting face;
wherein the rounded paddle further comprises:
a cuboidal mixing bar, wherein the cuboidal mixing bar has a mixing face, trailing face, first edge face, second edge face and mounting face;
wherein the mixing face and trailing face are perpendicular, and have a first edge, a mounting edge, a second edge, and a mixing edge;
wherein the first edge face is disposed on the first edge of the mixing face and trailing face, and the second face is disposed on the second edge of the mixing face and trailing face;
where the first edge face is square or rectangular and the second edge face is square or rectangular;
where the mixing edge is semispherical or ovoidal;
wherein the paddle is disposed on the interior of the tubular or conal wall at the mounting face;
wherein the finger-shaped flight further comprises:
a cuboidic mixing blade, where the cuboidic mixing blade has a mixing face, trailing face, mounting face edge and connecting edge;
a plurality of mixing fingers disposed on the connecting edge of the cuboidic mixing blade and at an angle to the cuboidic mixing blade;
wherein the finger-shaped flight is disposed on the interior of the tubular or conal wall at the mounting face edge;
wherein the angled flight further comprises:
a cuboidic mixing blade, where the cuboidic mixing blade has a mixing face, trailing face, mounting face edge and connecting edge;
an angled blade disposed on the connecting edge of the cuboidic mixing blade and at an angle to the cuboidic mixing blade;
wherein the angled flight is disposed on the interior of the tubular or conal wall at the mounting face edge; and
wherein the chi-shaped flight further comprises:
a leading blade formed of a leading tubular arc, where the tubular arc comprises a 160° to 300° arc when viewed in cross-section, and comprising:
a leading edge disposed on a first edge of the leading blade, a mixing face, and a trailing face;
a mounting edge disposed adjacent to the leading edge;
a trailing blade formed of a trailing tubular arc, where the tubular arc comprises a 160° to 300° arc when viewed in cross-section, and comprising:
a leading edge disposed on a first edge of the trailing blade, a leading face, and a trailing mixer face;
a mounting edge disposed adjacent to the leading edge;
wherein the leading blade of the chi-shaped flight is disposed on the interior of the tubular or conal wall at the leading blade mounting edge and the trailing blade of the chi-shaped flight is disposed on the interior of the tubular or conal wall at the trailing blade mounting edge.

5. The method of claim 1, further comprising heating the asphaltic concrete mix to a second temperature, wherein the second temperature is between 275° F. and 350° F.
wherein the induction heating system, further comprises a second induction heating coil disposed in the exterior of the heating drum at a second position adjacent to the output opening, and in magnetic communication with the magnetic material of the heating drum.

6. The method of claim 5, further comprising heating the asphaltic concrete mix to a third temperature, wherein the third temperature is between 350° F. and 650° F. wherein the induction heating system, further comprises a third induction heating coil disposed in the exterior of the heating drum at a third position adjacent to the input opening, and in magnetic communication with the magnetic material of the heating drum.

7. The method of claim 1, further comprising modifying the heated mix, comprising the steps:
placing the heated mix into an additive mixing chamber, wherein the additive mixing chamber further comprises:
a mixing drum or paddle mixer;
wherein the mixing drum further comprises a tubular or conal wall, encompassing an interior and having a first end and a second end;
an additive input disposed adjacent to the first end of the mixing drum and in communication with the output opening;
an additive output disposed adjacent to the second end of the mixing drum;
at least one mixing member disposed on the interior of the mixing drum tubular or conal wall;
adding at least one additive to the asphaltic heated mix, wherein the at least one additive is virgin asphalt cement, coarse aggregates, fine aggregates, rejuvenation oil, or a combination thereof;
wherein the rejuvenation oil is naphthenic-based oil formed of heavy naphthenic distillate solvent extract and heavy naphthenic petroleum distillate, an emulsion of hydrotreated heavy naphthenic petroleum distillate and heavy naphthenic distillate solvent extract in a cationic water solution, an anionic emulsions of water with asphalt and heavy naphthenic distillate solvent extract, an oil composed of heavy paraffinic distillate solvent extract, an oil composed of residual oil solvent extract, a paraffinic oil composed of heavy paraffinic petroleum neutral distillate solvents, petroleum-based motor oils, a mixture of acids and oils, or combinations thereof;
wherein the mixture of acids and oils is composed of long chain and tricyclic organic acids, resin acids, fatty acids, esterified fatty acids and vegetable oils;
mixing the heated mix and at least one modifier to form a modified heated mix; and
expelling the completed mix from the asphalt processing system.

8. The method of claim 7, further comprising heating the additive mixing chamber, comprising:
providing an inductive heating system, wherein the inductive heating system comprises:
at least one inductive heating element in the mixing drum, the at least one mixing member, or a combination thereof, wherein the at least one inductive heating element is composed of a magnetic material which heats upon exposure to magnetic forces;
a mixer induction heating coil disposed in the exterior of the mixing drum and in magnetic communication with the at least one inductive heating element;
rotating the mixing drum about a central axis;
applying a magnetic field to the mixer induction heating coil;
placing the asphaltic concrete mix into the mixing drum, wherein the mixing drum is heated to between 300° F. and 350° F.;
adding at least one additive to the mixing drum;
moving the asphaltic concrete mix along the mixing drum, wherein the asphaltic concrete mix is mixed while moving; and
expelling the completed mix from the asphalt processing system.

9. The method of claim 7, wherein the at least one mixing member comprises at least one mixing paddle, at least one U-shaped paddle, at least one S-shaped paddle, at least one paddle, at least one rounded paddle, at least one finger-shaped flight, at least one the angled flight, or at least one chi-shaped flight where:
the at least one mixing paddle further comprises:
a paddle comprising a flat front mixing face, a flat rear mixing face, and a mounting edge disposed between the flat front mixing face and the flat rear mixing face;
wherein the mounting edge of the paddle is disposed on the interior of the mixing drum;
the at least one U-shaped flight further comprises:
a flight comprising an arc mixing face formed of a leading tubular arc, where the tubular arc comprises a 160° to 300° arc when viewed in cross-section;
a mounting edge disposed on one edge of the mixing face, wherein the mounting edge of the U-shaped flight is disposed on the interior of the mixing drum; and
the at least one S-shaped flight further comprises:
a leading blade formed of a leading tubular arc, where the tubular arc comprises a 160° to 300° arc when viewed in cross-section, and comprising:
a leading edge disposed on a first edge of the leading blade;
a mounting edge disposed adjacent to the leading edge;
a connecting edge disposed on a second edge of the leading blade;
a trailing blade formed of a trailing tubular arc, where the tubular arc comprises a 160° to 300° arc when viewed in cross-section, and comprising:
a connecting edge disposed on a first edge of the trailing blade;
a trailing edge disposed on a second edge of the trailing blade;
wherein the connecting edge of the leading blade is connected to the connecting edge of the trailing blade;
wherein the S-shaped flight is disposed on the interior of the tubular or conal wall at the mounting edge;
the at least one paddle further comprises:
a cuboidic mixing bar, wherein the cuboidic mixing bar has a mixing face, trailing face, first edge face, second edge face and mounting face;
wherein the mixing face and trailing face are rectangular, and have a first edge, a mounting edge, a second edge, and a mixing edge;
wherein the first edge face is disposed on the first edge of the mixing face and trailing face, and the second face is disposed on the second edge of the mixing face and trailing face;
where the first edge face is square or rectangular and the second edge face is square or rectangular;
wherein the paddle is disposed on the interior of the tubular or conal wall at the mounting face;
the at least one rounded paddle further comprises:
a cuboidal mixing bar, wherein the cuboidal mixing bar has a mixing face, trailing face, first edge face, second edge face and mounting face;
wherein the mixing face and trailing face are perpendicular, and have a first edge, a mounting edge, a second edge, and a mixing edge;

wherein the first edge face is disposed on the first edge of the mixing face and trailing face, and the second face is disposed on the second edge of the mixing face and trailing face;

where the first edge face is square or rectangular and the second edge face is square or rectangular;

where the mixing edge is semispherical or ovoidal;

wherein the paddle is disposed on the interior of the tubular or conal wall at the mounting face;

the at least one finger-shaped flight further comprises:

a cuboidic mixing blade, where the cuboidic mixing blade has a mixing face, trailing face, mounting face edge and connecting edge;

a plurality of mixing fingers disposed on the connecting edge of the cuboidic mixing blade and at an angle to the cuboidic mixing blade;

wherein the finger-shaped flight is disposed on the interior of the tubular or conal wall at the mounting face edge;

the at least one angled flight further comprises:

a cuboidic mixing blade, where the cuboidic mixing blade has a mixing face, trailing face, mounting face edge and connecting edge;

an angled blade disposed on the connecting edge of the cuboidic mixing blade and at an angle to the cuboidic mixing blade;

wherein the angled flight is disposed on the interior of the tubular or conal wall at the mounting face edge; and the at least one chi-shaped flight further comprises:

a leading blade formed of a leading tubular arc, where the tubular arc comprises a 160° to 300° arc when viewed in cross-section, and comprising:

a leading edge disposed on a first edge of the leading blade, a mixing face, and a trailing face;

a mounting edge disposed adjacent to the leading edge;

a trailing blade formed of a trailing tubular arc, where the tubular arc comprises a 160° to 300° arc when viewed in cross-section, and comprising:

a leading edge disposed on a first edge of the trailing blade, a leading face, and a trailing mixer face.

10. An asphalt processing system, comprising:

a heating drum, wherein the heating drum further comprises:

a tubular or conal wall, encompassing an interior and having a first end and a second end;

wherein the tubular or conal wall is composed of a magnetic material which heats upon exposure to magnetic forces;

an input opening disposed adjacent to the first end of the tubular or conal wall;

at least one output opening disposed adjacent to the second end of the tubular or conal wall or disposed on the second end of the tubular or conal wall;

an induction heating system, comprising:

at least a first induction heating coil disposed in the exterior of the heating drum at a first position, and in magnetic communication with the magnetic material of the heating drum; and a drive system in communication with the heating drum and which rotates the heating drum.

11. The asphalt processing system of claim 10, wherein a ring pinion is disposed on the first end of the heating drum; a drive shaft is in communication with the ring pinion; and wherein the drive shaft is attached to a drive motor.

12. The asphalt processing system of claim 10, further comprising insulation disposed on the exterior of the heating drum wall, wherein the insulation is alumina-silica insulation, cellulose insulation, or combinations thereof.

13. The asphalt processing system of claim 10, wherein the heating drum is attached to a drive shaft, where the drive shaft rotatably extends through the first end the heating chamber; and wherein the drive shaft is attached to a drive motor.

14. The asphalt processing system of claim 13, wherein the drive shaft is supported by a plurality of shaft support members, wherein the shaft support members comprise:

at least one vertical shaft support member having an upper end and a lower end;

a shaft support ring disposed on the upper end of the at least one vertical shaft support member and in communication with the drive shaft;

a plurality of ball bearings disposed in the shaft support ring.

15. The asphalt processing system of claim 10, wherein the heating drum is supported by a plurality of drum support members, wherein the drum support members comprise:

at least one vertical drum support member having an upper end and a lower end;

a drum support ring disposed on the upper end of the at least one vertical drum support member and in communication with the exterior of the heating drum;

a plurality of ball bearings disposed in the drum support ring.

16. The asphalt processing system of claim 10, wherein the induction heating system, further comprises a second induction heating coil disposed in the exterior of the heating drum at a second position, and in magnetic communication with the magnetic material of the heating drum.

17. The asphalt processing system of claim 16, wherein the induction heating system, further comprises a third induction heating coil disposed in the exterior of the heating drum at a third position, and in magnetic communication with the magnetic material of the heating drum.

18. The asphalt processing system of claim 17, wherein the induction heating system, further comprises a fourth induction heating coil disposed in the exterior of the heating drum at a fourth position, and in magnetic communication with the magnetic material of the heating drum.

19. The asphalt processing system of claim 10, further comprising at least one heating transfer flight disposed on the interior face of the tubular or conal wall, wherein the at least one heating transfer flight is formed of at least one magnetic material wherein the at least one heating transfer flight is an S-shaped flight, paddle, finger-shaped flight, angled flight, chi-shaped flight, or a combination thereof;

where the least one heating transfer flight is composed of a magnetic material which heats upon exposure to magnetic forces;

wherein the S-shaped flight further comprises:

a leading blade formed of a leading tubular arc, where the tubular arc comprises a 160° to 300° arc when viewed in cross-section, and comprising:

a leading edge disposed on a first edge of the leading blade;

a mounting edge disposed adjacent to the leading edge;

a connecting edge disposed on a second edge of the leading blade;

a trailing blade formed of a trailing tubular arc, where the tubular arc comprises a 160° to 300° arc when viewed in cross-section, and comprising:
   a connecting edge disposed on a first edge of the trailing blade;
   a trailing edge disposed on a second edge of the trailing blade;
   wherein the connecting edge of the leading blade is connected to the connecting edge of the trailing blade;
   wherein the S-shaped flight is disposed on the interior of the tubular or conal wall at the mounting edge;
wherein the paddle further comprises:
   a cuboidic mixing bar, wherein the cuboidic mixing bar has a mixing face, trailing face, first edge face, second edge face and mounting face;
   wherein the mixing face and trailing face are rectangular, and have a first edge, a mounting edge, a second edge, and a mixing edge;
   wherein the first edge face is disposed on the first edge of the mixing face and trailing face, and the second face is disposed on the second edge of the mixing face and trailing face;
   where the first edge face is square or rectangular and the second edge face is square or rectangular;
   wherein the paddle is disposed on the interior of the tubular or conal wall at the mounting face;
wherein the finger-shaped flight further comprises:
   a cuboidic mixing blade, where the cuboidic mixing blade has a mixing face, trailing face, mounting face edge and connecting edge;
     a plurality of mixing fingers disposed on the connecting edge of the cuboidic mixing blade and at an angle to the cuboidic mixing blade;
     wherein the finger-shaped flight is disposed on the interior of the tubular or conal wall at the mounting face edge;
wherein the angled flight further comprises:
   a cuboidic mixing blade, where the cuboidic mixing blade has a mixing face, trailing face, mounting face edge and connecting edge;
   an angled blade disposed on the connecting edge of the cuboidic mixing blade and at an angle to the cuboidic mixing blade;
   wherein the angled flight is disposed on the interior of the tubular or conal wall at the mounting face edge; and
wherein the chi-shaped flight further comprises:
   a leading blade formed of a leading tubular arc, where the tubular arc comprises a 160° to 300° arc when viewed in cross-section, and comprising:
     a leading edge disposed on a first edge of the leading blade, a mixing face, and a trailing face;
     a mounting edge disposed adjacent to the leading edge;
   a trailing blade formed of a trailing tubular arc, where the tubular arc comprises a 160° to 300° arc when viewed in cross-section, and comprising:
     a leading edge disposed on a first edge of the trailing blade, a leading face, and a trailing mixer face;
     a mounting edge disposed adjacent to the leading edge
   wherein the leading blade of the chi-shaped flight is disposed on the interior of the tubular or conal wall at the leading blade mounting edge and the trailing blade of the chi-shaped flight is disposed on the interior of the tubular or conal wall at the trailing blade mounting edge.

20. The asphalt processing system of claim 19, wherein the chi-shaped flight further comprises:
   the leading blade from a first chi-shaped flight connected to the trailing blade of a second chi-shaped flight;
     where the trailing face of the leading blade from a first chi-shaped flight is connected to the leading face of the trailing blade of the second chi-shaped flight; and
   an asphalt slide disposed on the upper edge of trailing face of the leading blade from a first chi-shaped flight and leading face of the trailing blade of the second chi-shaped flight.

21. The asphalt processing system of claim 10, further comprising an additive mixing system in communication with the at least one output opening, wherein the additive mixing system comprises:
   a mixing drum, wherein the mixing drum further comprises a tubular or conal wall, encompassing an interior and having a first end and a second end;
   an additive input disposed adjacent to the first end of the mixing drum and in communication with the output opening;
   an additive output disposed adjacent to the second end of the mixing drum; and
   at least one mixing member disposed on the interior of the mixing drum tubular or conal wall.

22. The asphalt processing system of claim 21, further comprising insulation disposed on the exterior of the mixing drum wall, wherein the insulation is alumina-silica insulation, cellulose insulation, or combinations thereof.

23. The asphalt processing system of claim 21, wherein the at least one mixing member comprises at least one mixing paddle, at least one U-shaped paddle, or at least one S-shaped paddle, where:
   the at least one mixing paddle further comprises:
     a paddle comprising a flat front mixing face, a flat rear mixing face, and a mounting edge disposed between the flat front mixing face and the flat rear mixing face;
       wherein the mounting edge of the paddle is disposed on the interior of the mixing drum;
   the at least one U-shaped flight further comprises:
     a flight comprising an arc mixing face formed of a leading tubular arc, where the tubular arc comprises a 160° to 300° arc when viewed in cross-section;
     a mounting edge disposed on one edge of the mixing face, wherein the mounting edge of the U-shaped flight is disposed on the interior of the mixing drum; and
   the at least one S-shaped flight further comprises:
     leading face formed of a leading tubular arc, where the tubular arc comprises a 160° to 300° arc when viewed in cross-section, and comprising:
       a leading edge disposed on a first edge of the leading tubular arc;
       a mounting edge disposed adjacent to the leading edge;
       a connecting edge disposed on a second edge of the tubular arc;
     a trailing face formed of a trailing tubular arc, where the tubular arc comprises a 160° to 300° arc when viewed in cross-section, and comprising:
       a connecting edge disposed on a first edge of the trailing tubular arc;

a trailing edge disposed on a second edge of the trailing tubular arc;

wherein the connecting edge of the leading tubular arc is connected to the connecting edge of the trailing tubular arc;

wherein the mounting edge of the S-shaped flight is disposed on the interior of the mixing drum.

24. The asphalt processing system of claim 21, further comprising a mixer induction heating system, wherein the mixer induction heating system comprises:

a mixer induction heating coil disposed in the exterior of the mixing drum;

wherein the mixing drum tubular or conal wall is composed of a magnetic material which heats upon exposure to magnetic forces; and wherein the mixer induction heating coil is in magnetic communication with the magnetic material of the mixing drum tubular or conal wall.

25. The asphalt processing system of claim 21, further comprising a mixer induction heating system, wherein the mixer induction heating system comprises:

a mixer induction heating coil disposed in the exterior of the mixing drum;

wherein the mixing member is composed of a magnetic material which heats upon exposure to magnetic forces; and wherein the mixer induction heating coil is in magnetic communication with the magnetic material of the mixing member.

26. The asphalt processing system of claim 21, wherein the mixing drum is circumferential to the heating drum.

27. The asphalt processing system of claim 26, further comprising:

a plurality of trunions, bearings, rollers, or a combination thereof disposed outside the mixing drum and in rotatable communication with the mixing drum; and a drive system in communication with the mixing drum, wherein the drive system is thrust rollers, saddle chain drive, rack and pinion drive, or a combination thereof.

* * * * *